(12) United States Patent  
Shimizu et al.

(10) Patent No.: US 12,509,777 B2  
(45) Date of Patent: Dec. 30, 2025

(54) SURFACE-TREATED STEEL SHEET

(71) Applicant: NIPPON STEEL CORPORATION, Tokyo (JP)

(72) Inventors: Atsuo Shimizu, Tokyo (JP); Ikumi Tokuda, Tokyo (JP); Hiromasa Shoji, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 188 days.

(21) Appl. No.: 18/283,678

(22) PCT Filed: Mar. 29, 2022

(86) PCT No.: PCT/JP2022/015303  
§ 371 (c)(1),  
(2) Date: Sep. 22, 2023

(87) PCT Pub. No.: WO2022/210650  
PCT Pub. Date: Oct. 6, 2022

(65) Prior Publication Data  
US 2024/0175140 A1    May 30, 2024

(30) Foreign Application Priority Data  
Mar. 29, 2021   (JP) .................................. 2021-055665

(51) Int. Cl.  
*C23C 30/00* (2006.01)  
*B32B 15/01* (2006.01)  
(Continued)

(52) U.S. Cl.  
CPC ............ *C23C 28/32* (2013.01); *B32B 15/013* (2013.01); *B32B 15/04* (2013.01); *B32B 15/043* (2013.01);  
(Continued)

(58) Field of Classification Search  
CPC ......... C23C 28/32; C23C 28/00; C23C 28/30; C23C 28/321; C23C 28/3225;  
(Continued)

(56) References Cited

U.S. PATENT DOCUMENTS

2013/0157076 A1\* 6/2013 Matsuno .................. C09D 5/08  
428/626  
2014/0050939 A1 2/2014 Morishita et al.  
(Continued)

FOREIGN PATENT DOCUMENTS

CN   103635607 A   3/2014  
EP     4242345 A1   9/2023  
(Continued)

*Primary Examiner* — Michael E. La Villa  
(74) *Attorney, Agent, or Firm* — Renner, Otto, Boisselle & Sklar, LLP

(57) ABSTRACT

A surface-treated steel sheet including a steel sheet, a zinc-based plated layer, and a chemical conversion treatment layer that contains Si, C, O and P, and has a C concentration of 20.0 mass % or more, an O concentration of 15.0 mass % or more, a Si concentration of 10.0 mass % or more, and a P concentration of 0.10 mass % or more. When t is a thickness of the chemical conversion treatment layer, an area from a surface to a position of t/10 from the surface is a surface layer region, an area from the position of 9t/10 from the surface to an interface between the treatment layer and the plated layer is an interface side region, and a region sandwiched therebetween is an intermediate region. A maximum value of a P concentration of the surface layer region is 1.5 times to 5.0 times the average P concentration of an intermediate region.

8 Claims, 1 Drawing Sheet

(51) Int. Cl.
<table>
<tr><td>B32B 15/04</td><td>(2006.01)</td></tr>
<tr><td>B32B 15/18</td><td>(2006.01)</td></tr>
<tr><td>B32B 15/20</td><td>(2006.01)</td></tr>
<tr><td>C23C 2/06</td><td>(2006.01)</td></tr>
<tr><td>C23C 2/26</td><td>(2006.01)</td></tr>
<tr><td>C23C 22/07</td><td>(2006.01)</td></tr>
<tr><td>C23C 22/08</td><td>(2006.01)</td></tr>
<tr><td>C23C 22/36</td><td>(2006.01)</td></tr>
<tr><td>C23C 22/44</td><td>(2006.01)</td></tr>
<tr><td>C23C 22/73</td><td>(2006.01)</td></tr>
<tr><td>C23C 22/82</td><td>(2006.01)</td></tr>
<tr><td>C23C 28/00</td><td>(2006.01)</td></tr>
<tr><td>C23C 2/40</td><td>(2006.01)</td></tr>
<tr><td>C23C 22/68</td><td>(2006.01)</td></tr>
</table>

(52) U.S. Cl.
CPC ............ *B32B 15/18* (2013.01); *B32B 15/20* (2013.01); *C23C 2/06* (2013.01); *C23C 2/26* (2013.01); *C23C 22/07* (2013.01); *C23C 22/08* (2013.01); *C23C 22/36* (2013.01); *C23C 22/361* (2013.01); *C23C 22/44* (2013.01); *C23C 22/73* (2013.01); *C23C 22/82* (2013.01); *C23C 28/00* (2013.01); *C23C 28/30* (2013.01); *C23C 28/321* (2013.01); *C23C 28/3225* (2013.01); *C23C 28/34* (2013.01); *C23C 28/341* (2013.01); *C23C 28/345* (2013.01); *C23C 30/00* (2013.01); *C23C 30/005* (2013.01); *C23C 2/40* (2013.01); *C23C 22/68* (2013.01); *C23C 2222/20* (2013.01); *Y10T 428/1259* (2015.01); *Y10T 428/12597* (2015.01); *Y10T 428/12604* (2015.01); *Y10T 428/12611* (2015.01); *Y10T 428/12618* (2015.01); *Y10T 428/12625* (2015.01); *Y10T 428/12799* (2015.01); *Y10T 428/12993* (2015.01); *Y10T 428/24942* (2015.01); *Y10T 428/2495* (2015.01); *Y10T 428/24959* (2015.01)

(58) Field of Classification Search
CPC ..... C23C 28/34; C23C 28/341; C23C 28/345; C23C 2/06; C23C 2/26; C23C 2/40; C23C 22/07; C23C 22/08; C23C 22/36; C23C 22/361; C23C 22/44; C23C 22/73; C23C 22/82; C23C 22/68; C23C 30/00; C23C 30/005; C23C 2222/20; Y10T 428/12799; Y10T 428/12611; Y10T 428/12618; Y10T 428/12625; Y10T 428/2495; Y10T 428/24959; Y10T 428/24942; Y10T 428/1259; Y10T 428/12597; Y10T 428/12604; Y10T 428/12993; B32B 15/013; B32B 15/04; B32B 15/043; B32B 15/18; B32B 15/20
See application file for complete search history.

(56) References Cited

U.S. PATENT DOCUMENTS

<table>
<tr><td>2018/0112313 A1</td><td>4/2018</td><td>Dahlenburg et al.</td></tr>
<tr><td>2022/0145473 A1</td><td>5/2022</td><td>Shoji et al.</td></tr>
</table>

FOREIGN PATENT DOCUMENTS

<table>
<tr><td>JP</td><td>2008-133510 A</td><td>6/2008</td></tr>
<tr><td>JP</td><td>2009-102688 A</td><td>5/2009</td></tr>
<tr><td>JP</td><td>2020-007606 A</td><td>1/2020</td></tr>
<tr><td>WO</td><td>2012/147860 A1</td><td>11/2012</td></tr>
<tr><td>WO</td><td>2014/084371 A1</td><td>6/2014</td></tr>
<tr><td>WO</td><td>2016/162422 A1</td><td>10/2016</td></tr>
<tr><td>WO</td><td>2018/083784 A1</td><td>5/2018</td></tr>
<tr><td>WO</td><td>2020/189769 A1</td><td>9/2020</td></tr>
</table>

* cited by examiner

SURFACE-TREATED STEEL SHEET

TECHNICAL FIELD OF THE INVENTION

The present invention relates to a surface-treated steel sheet.

Priority is claimed on Japanese Patent Application No. 2021-055665 filed Mar. 29, 2021, the content of which is incorporated herein by reference.

RELATED ART

Plated steel sheets (zinc-based plated steel sheets) in which a plated layer containing a zinc as a main component (zinc-based plated layer) is formed on a surface of a steel sheet have been heretofore used in a wide range of applications such as automobiles, building materials and household electric appliances. By forming a zinc-based plated layer, excellent corrosion resistance is imparted to a steel sheet.

In recent years, zinc-based plated steel sheets have also been used as design materials because a plated layer has a unique external appearance, and the exterior color changes from silvery-white to subdued grayish-brown due to oxidation of the plated layer. Of these, zinc-based plated steel sheets containing Sb in a plated layer are used as materials having higher designability because a bloomed blossom-like crystal pattern (spangle pattern) originating from crystals of a zinc is notably formed.

However, zinc-based plated steel sheets have a problem that white rust which is zinc oxide is generated due to corrosion, and the white rust impairs the external appearance.

Heretofore, as a common technique for suppressing generation of such white rust, chemical conversion treatment mainly including a resin has been performed on a zinc-based plated layer as disclosed in Patent Documents 1 to 4.

However, in chemical conversion treatment containing a resin as disclosed in Patent Documents 1 to 4, black refuse resistance during processing is insufficient because an organic resin component is used. The black refuse resistance during processing refers to resistance to a situation in which when a metal is subjected to processing such as press processing, a metal material surface receives heavy sliding movement from a press die or the like, so that a black deposit substance is generated from a film covering the metal material surface, solidly stuck, and deposited, resulting in impairment of the external appearance. Generation of block refuge substance may be caused by an organic resin component for chemical conversion treatment.

As chemical conversion treatment capable of suppressing generation of the black deposit, chemical conversion treatment mainly including an organosilicon compound having a cyclic siloxane bond as disclosed in Patent Document 5 is known. Patent Document 5 indicates that chemical conversion treatment mainly including an organosilicon compound having a cyclic siloxane bond enables suppression of generation of black deposit even in severe processing due to the extremely small organic resin content, and exhibits high fingerprint resistance and white rust resistance.

CITATION LIST

Patent Document

[Patent Document 1]
  Japanese Unexamined Patent Application, First Publication No. 2020-7606
[Patent Document 2]
  PCT International Publication No. WO 2014/084371
[Patent Document 3]
  PCT International Publication No. WO 2018/083784
[Patent Document 4]
  PCT International Publication No. WO 2016/162422
[Patent Document 5]
  PCT International Publication No. WO 2012/147860

SUMMARY OF INVENTION

Problems to be Solved by the Invention

However, chemical conversion treatment mainly including an organosilicon compound having a cyclic siloxane bond as disclosed in Patent Document 5 has been developed for conventional applications of zinc plating, that is, applications other than design applications. On the other hand, zinc-based plated steel sheets have been used as design materials in recent years as described above. In design applications, higher fingerprint resistance is required as compared to conventional applications, but there is a possibility that chemical conversion treatment mainly including an organosilicon compound having a cyclic siloxane bond as shown in Patent Document 5 cannot sufficiently meet requirements in design applications.

In view of such a background, an object of the present invention is to provide a surface-treated steel sheet including a zinc-based plated layer and a chemical conversion treatment layer formed on a surface of the zinc-based plated layer, and having sufficient corrosion resistance (white rust resistance), and excellent fingerprint resistance higher than before (sufficient performance even for design applications).

Means for Solving the Problem

The present inventors have conducted studies on a method for improving fingerprint resistance in a surface-treated steel sheet including a zinc-based plated layer and a chemical conversion treatment layer. It is to be noted that in relation to black deposit resistance, the studies have been conducted on the premise that the chemical conversion treatment layer has no organic resin.

As a result, the following findings were obtained.

(a) A surface that is unlikely to be stained with fingerprints can be formed by segregating P in a surface layer area of the chemical conversion treatment layer to adjust surface free energy.

(b) Not only fingerprint resistance but also corrosion resistance (white rust resistance) can be improved by further segregating F in the vicinity of an interface with a plated layer in the chemical conversion treatment layer.

(c) Blackening resistance can also be improved by further segregating Sb in the vicinity of an interface with the plated layer in the chemical conversion treatment layer.

The present invention has been made on the basis of the above-described findings. The gist of the present invention is as follows.

[1] A surface-treated steel sheet according to an aspect of the present invention includes a steel sheet, a zinc-based plated layer formed on a surface of the steel sheet, and a chemical conversion treatment layer formed on a surface of the zinc-based plated layer, in which the chemical conversion treatment layer contains Si, C, O and P, the chemical conversion treatment layer has a C concentration of 20.0 mass % or more, an O concentration of 15.0 mass % or more, a Si concentration of 10.0 mass % or more, and a P concentration of 0.10 mass % or more, when t is a thickness of the chemical conversion treatment layer, an area starting from a surface of the chemical conversion treatment layer and ending at a position of t/10 from the surface of the chemical conversion treatment layer in a thickness direction is a surface layer region, an area starting from the position of 9t/10 from the surface of the chemical conversion treatment layer in the thickness direction and ending at an interface between the chemical conversion treatment layer and the zinc-based plated layer is an interface side region, and a region sandwiched between the surface layer region and the interface side region is an intermediate region and a maximum value of a P concentration of the surface layer region is 1.5 times to 5.0 times an average P concentration of an intermediate region.

[2] In the surface-treated steel sheet of [1], Al may be present in the interface side region, and an F content of the interface side region may be 20% or more of an F content of the entire chemical conversion treatment layer.

[3] In the surface-treated steel sheet of [1] or [2], Sb may be present in the interface side region.

[4] In the surface-treated steel sheet of any one of [1] to [3], a surface of the zinc-based plated layer may be regular spangle-finished.

Effects of the Invention

According to the above-described aspect of the present invention, it is possible to provide a surface-treated steel sheet excellent in fingerprint resistance.

According to a preferred aspect of the present invention, it is possible to provide a surface-treated steel sheet excellent in corrosion resistance and/or blackening resistance in addition to fingerprint resistance.

EMBODIMENT OF THE INVENTION

Hereinafter, a surface-treated steel sheet according to an embodiment of the present invention (surface-treated steel sheet according to the present embodiment) will be described.

Figure 1:
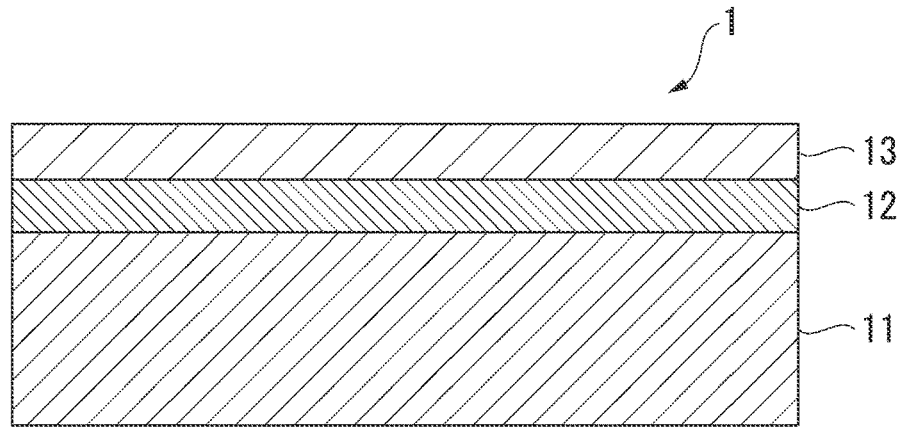
FIG. 1 is a view showing an example of a cross section of a surface-treated steel sheet according to the present embodiment.

As shown in FIG. 1, a surface-treated steel sheet 1 according to the present embodiment includes a steel sheet 11, a zinc-based plated layer 12 formed on a surface of the steel sheet 11, and a chemical conversion treatment layer 13 formed on a surface of the zinc-based plated layer 12.

Figure 2:
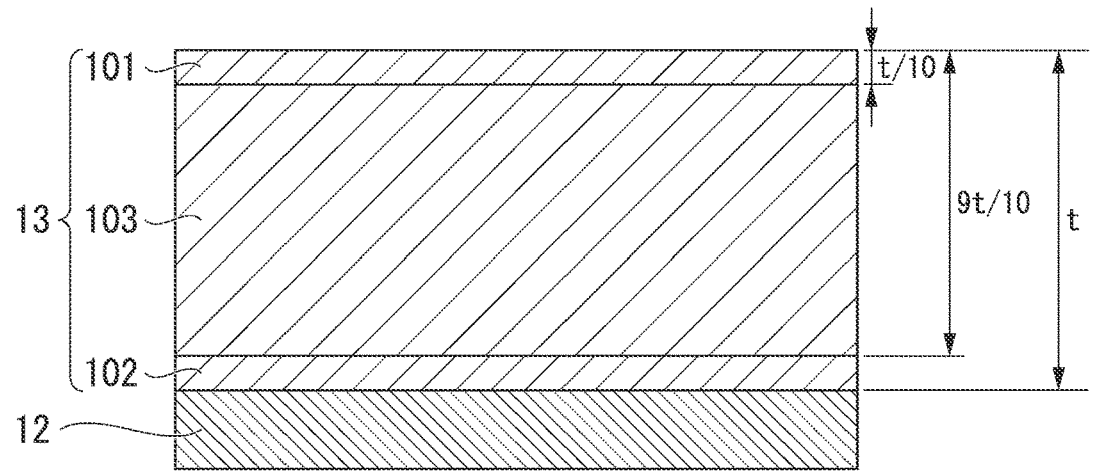
FIG. 2 is a view illustrating a chemical conversion treatment layer of the surface-treated steel sheet according to the present embodiment.
Figure 3:
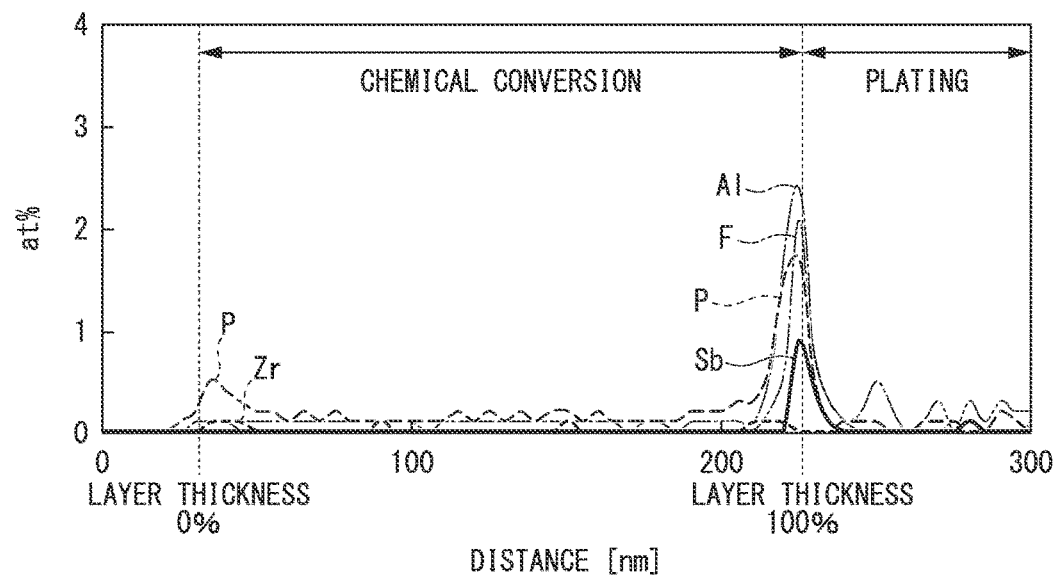
FIG. 3 is a diagram showing an example of a results of performing continuous point analysis using EDS for the chemical conversion treatment layer of the surface-treated steel sheet according to the present embodiment.

The chemical conversion treatment layer 13 contains Si, C, O and P, and has a C concentration of 20.0 mass % or more, an O concentration of 15.0 mass % or more, a Si concentration of 10.0 mass % or more, and a P concentration of 0.10 mass % or more. As shown in FIG. 2, when t is a thickness of the chemical conversion treatment layer 13, an area starting from a surface of the chemical conversion treatment layer 13 and ending at a position of t/10 from the surface of the chemical conversion treatment layer 13 in a thickness direction is a surface layer region 101, an area starting from the position of 9t/10 from the surface of the chemical conversion treatment layer 13 in the thickness direction and ending at an interface between the chemical conversion treatment layer 13 and the zinc-based plated layer 12 (at a position of t from the surface in the thickness direction) is an interface side region 102, and a region sandwiched between the surface layer region 101 and the interface side region 102 is the intermediate region 103, a maximum value of a P concentration of the surface layer region 101 is 1.5 to 5.0 times the average P concentration of an intermediate region 103.

In FIG. 1, the zinc-based plated layer 12 and the chemical conversion treatment layer 13 (surface layer region 101+ intermediate region 103+interface side region 102) are formed on one surface of the steel sheet 11, but may be formed on both surfaces of the steel sheet 11.

<Steel Sheet (Base Steel Sheet)>

The zinc-based plated layer 12 and the chemical conversion treatment layer 13 characterize the surface-treated steel sheet 1 according to the present embodiment. Therefore, the steel sheet 11 is not particularly limited. The steel sheet 11 may be determined according to a product to be applied, required strength, sheet thickness and the like, and for example, a hot-rolled steel sheet described in JIS G 3193: 2019 or a cold-rolled steel sheet described in JIS G 3141: 2017 may be used.

<Zinc-Based Plated Layer>

The zinc-based plated layer 12 of the surface-treated steel sheet 1 according to the present embodiment is a zinc-based plated layer formed on a surface of the steel sheet 11 and containing a zinc.

[Chemical Composition]

The chemical composition of the zinc-based plated layer 12 is not limited as long as it is a plated layer containing a zinc as a main component.

However, a chemical composition of Al: 4.0% or more and less than 25.0%, Mg: 0% or more and less than 12.5%, Sn: 0% to 20%, Bi: 0% or more and less than 5.0%, In: 0% or more and less than 2.0%, Ca: 0% to 3.0%, Y: 0% to 0.5%, La: 0% or more and less than 0.5%, Ce: 0% or more and less than 0.5%, Si: 0% or more and less than 2.5%, Cr: 0% or more and less than 0.25%, Ti: 0% or more and less than 0.25%, Ni: 0% or more and less than 0.25%, Co: 0% or more and less than 0.25%, V: 0% or more and less than 0.25%, Nb: 0% or more and less than 0.25%, Cu: 0% or more and less than 0.25%, Mn: 0% or more and less than 0.25%, Fe: 0% to 5.0%, Sb: 0% or more and less than 0.5%, Sr: 0% or more and less than 0.5%, Pb: 0% or more and less than 0.5%, B: 0% or more and less than 0.5%, and remainder: Zn and impurities is preferable because a more significant effect of improving corrosion resistance is obtained.

The reason why the above-mentioned chemical composition of the zinc-based plated layer (hereinafter, sometimes referred to simply as a plated layer) 12 is preferable will be described. Hereinafter, a numerical value range indicated by numerical values with the term "to" interposed therebetween essentially includes the numerical values at both ends as a lower limit and an upper limit, respectively. That is, for example, "0% to 20%" represents 0% or more and 20% or less.

Unless otherwise specified, "%" related to the chemical composition of the zinc-based plated layer represents mass %.

[Al: 4.0% or more and less than 25.0%]

Al is an element effective for improving corrosion resistance in the zinc-based plated layer. When Al is made to be contained in the chemical conversion treatment layer, it is preferable that the plated layer contains Al. For obtaining the above-described effect to a sufficient extent, the Al concentration is preferably 4.0% or more.

On the other hand, if the Al concentration is 25.0% or more, the corrosion resistance of a cut end surface of the zinc-based plated layer decreases. For this reason, the Al concentration is preferably less than 25.0%.

The zinc-based plated layer 12 may contain Al, with the remainder consisting of Zn and impurities. However, the following elements may be further contained.

[Mg: 0% or more and less than 12.5%]

Mg is an element having an effect of enhancing the corrosion resistance of the plated layer. For obtaining the above-described effect to a sufficient extent, the Mg concentration is preferably more than 1.0%.

On the other hand, a Mg concentration of 12.5% or more does not lead to further enhancement of the corrosion resistance improving effect, and may deteriorate the workability of the plated layer. In addition, there is a manufacture-related problem such as an increase in amount of dross generated in a plating bath. For this reason, the Mg concentration is preferably less than 12.5%.

[Sn: 0% to 20.0%]
[Bi: 0% or more and less than 5.0%]
[In: 0% or more and less than 2.0%]

These elements contribute to improvement of corrosion resistance and sacrificial corrosion resistance. Therefore, one or more of these elements may be contained. For obtaining the above-described effect to a sufficient extent, the concentration of each of the elements is preferably 0.05% or more, or 0.1% or more.

Of these, Sn is preferable because it is a low-melting-point metal and can be easily incorporated without impairing the properties of the plating bath.

On the other hand, if the Sn concentration is more than 20.0%, the Bi concentration is 5.0% or more, or the In concentration is 2.0% or more, corrosion resistance decreases. For this reason, it is preferable that the Sn concentration is 20.0% or less, the Bi concentration is less than 5.0%, and the In concentration is less than 2.0%.

[Ca: 0% to 3.0%]

Ca is an element which reduces the amount of formation of dross likely to be formed during operation, and contributes to improvement of plating manufacturability. Therefore, Ca may be contained. For obtaining this effect, the Ca concentration is preferably 0.1% or more.

On the other hand, if the Ca concentration is high, the corrosion resistance of a flat portion itself of the plated layer tends to be deteriorated, and the corrosion resistance of the periphery of the weld may also be deteriorated. For this reason, the Ca concentration is preferably 3.0% or less.

[Y: 0% to 0.5%]
[La: 0% or more and less than 0.5%]
[Ce: 0% or more and less than 0.5%]

Y, La and Ce are elements that contribute to improvement of corrosion resistance. For obtaining this effect, it is preferable that one or more of these elements are each contained at 0.05% or more, or 0.1% or more.

On the other hand, if the concentration of these elements is excessively high, there is a concern that the viscosity of the plating bath increases, and thus the initial make-up of the plating bath itself is often difficult, and a steel having good plating properties cannot be manufactured. For this reason, it is preferable that the Y concentration is 0.5% or less, the La concentration is less than 0.5%, and the Ce concentration is less than 0.5%.

[Si: 0% or more and less than 2.5%]

Si is an element that contributes to improvement of corrosion resistance. In addition, Si is an element having an effect of enhancing adhesion between the steel sheet and the plated layer by suppressing a situation in which an alloy layer formed between a steel sheet surface and the plated layer in formation of the plated layer on the steel sheet has an excessively large thickness. For obtaining these effects, the Si concentration is preferably 0.1% or more. The Si concentration is more preferably 0.2% or more.

On the other hand, if the Si concentration is 2.5% or more, an excessive amount of Si is precipitated in the plated layer, so that not only corrosion resistance decreases but also the workability of the plated layer is deteriorated. Therefore, the Si concentration is preferably less than 2.5%. The Si concentration is more preferably 1.5% or less.

[Cr: 0% or more and less than 0.25%]
[Ti: 0% or more and less than 0.25%]
[Ni: 0% or more and less than 0.25%]
[Co: 0% or more and less than 0.25%]
[V: 0% or more and less than 0.25%]
[Nb: 0% or more and less than 0.25%]
[Cu: 0% or more and less than 0.25%]
[Mn: 0% or more and less than 0.25%]

These elements contribute to improvement of corrosion resistance. For obtaining this effect, it is preferable that the concentration of at least one of the elements is 0.05% or more.

On the other hand, if the concentration of these elements is excessively high, there is a concern that the viscosity of the plating bath increases, and thus the initial make-up of the plating bath itself is often difficult, and a steel having good plating properties cannot be manufactured. For this reason, the concentration of each of the elements is preferably less than 0.25%.

[Fe: 0% to 5.0%]

Fe is mixed in the plated layer as an impurity in manufacture of the plated layer. Fe may be contained at up to about 5.0%, and as long as the content of Fe is in this range, there is little adverse impact on the effect of the surface-treated steel sheet according to the present embodiment. For this reason, the Fe concentration is preferably 5.0% or less.

[B: 0% or more and less than 0.5%]

B is an element that bonds to Zn, Al, Mg or the like to form various intermetallic compounds when contained in the plated layer. Such intermetallic compounds have an effect of improving LME. For obtaining this effect, the B concentration is preferably 0.05% or more.

On the other hand, if the B concentration is excessively high, there is a concern that the melting point of plating significantly increases, and this plating operability is deteriorated, so that a surface-treated steel sheet having good plating properties cannot be obtained. For this reason, the B concentration is preferably less than 0.5%.

[Sb: 0% or more and less than 0.5%]

When the plated layer contains Sb, the external appearance of the plated layer changes, a spangle is formed, and improvement in metallic gloss is observed. For obtaining this effect, the Sb concentration is preferably 0.03% or more.

On the other hand, if the Sb concentration is excessively high, there is a concern that the viscosity of the plating bath increases, and thus the initial make-up of the plating bath itself is often difficult, and a steel having good plating properties cannot be manufactured. For this reason, the Sb concentration is preferably less than 0.5%.

[Sr: 0% or more and less than 0.5%]
[Pb: 0% or more and less than 0.5%]

Like Sb, Sr and Pb are elements that contribute to formation of a spangle. For obtaining this effect, it is preferable that the concentration of at least one of Sr and Pb is 0.05% or more.

On the other hand, if the concentration of these elements is excessively high, there is a concern that the viscosity of the plating bath increases, and thus the initial make-up of the plating bath itself is often difficult, and a steel having good plating properties cannot be manufactured. For this reason, the concentration of each of the elements is preferably less than 0.5%.

The thickness of the zinc-based plated layer 12 is not limited, and is preferably 10 g/m$^2$ or more per one surface for improving corrosion resistance. On the other hand, a thickness of more than 200 g/m$^2$ does not lead to further enhancement of corrosion resistance, and causes an economic disadvantage. For this reason, the thickness is preferably 200 g/m$^2$ or less.

[Spangle]

From the viewpoint of designability, it is preferable that a spangle pattern is formed on a surface of the zinc-based plated layer 12 in the surface-treated steel sheet 1 according to the present embodiment.

The spangle pattern generally includes a regular spangle and a minimized spangle, and from the viewpoint of designability, a regular spangle is more preferable. That is, it is preferable that surface of the zinc-based plated layer 12 in the surface-treated steel sheet 1 according to the present embodiment is regular spangle-finished.

<Chemical Conversion Treatment Layer>

The chemical conversion treatment layer 13 of the surface-treated steel sheet 1 according to the present embodiment contains Si, C, O and P, and has a C concentration of 20.0 mass % or more, an O concentration of 15.0 mass % or more, and a Si concentration of 10.0 mass % or more. That is, since the chemical conversion treatment layer 13 contains an inorganic component as a main component, excellent black deposit resistance is obtained. The upper limit of each of the C concentration, the O concentration and the Si concentration is not specified, and the C concentration is more than 40.0 mass % mainly when the main component is an organic component. For this reason, the C concentration is preferably 40.0 mass % or less. From the viewpoint of the powdering property of the chemical conversion treatment layer 13, it is preferable that the O concentration is 40.0 mass % or less, and the Si concentration is 25.0 mass % or less.

The chemical conversion treatment layer 13 of the surface-treated steel sheet according to the present embodiment is obtained by applying a treatment solution containing an organosilicon compound such as a silane coupling agent and a P compound such as a phosphate on a plated layer containing a zinc under predetermined conditions and performing drying. Therefore, the chemical conversion treatment layer 13 of the surface-treated steel sheet according to the present embodiment contains Si, C, O and P.

If P is not contained at 0.10 mass % or more, generally required corrosion resistance cannot be obtained. For this reason, the P concentration is 0.10 mass % or more. On the other hand, an excessively high P concentration is not preferable because powdering is likely to occur. If the P concentration of the treatment liquid is high, the amount of soluble components tends to be large, leading a decrease in corrosion resistance. For this reason, the P concentration of the chemical conversion treatment layer is preferably 5.0 mass % or less.

A F compound (fluorine compound), a Zr compound (zirconium compound) and/or a V compound (vanadium compound) may be contained in the treatment solution so that the chemical conversion treatment layer 13 of the surface-treated steel sheet according to the present embodiment further contains F, Zr and/or V derived from these compounds. The chemical conversion treatment layer 13 may contain Al, Zn, Sb or the like eluted from the zinc-based plated layer.

In the chemical conversion treatment layer 13, the solid content mass ratio between P derived from the phosphorus compound (W) and Si derived from the organosilicon compound (V) [(Ws)/(Vs)], is preferably 0.15 to 0.31. A solid content mass ratio [(Ws)/(Vs)] of less than 0.15 is not preferable because an effect of the phosphorus compound (W) as an elutability inhibitor cannot be obtained.

On the other hand, a solid content mass ratio [(Ws)/(Vs)] of more than 0.31 is not preferable because the chemical conversion treatment layer is significantly dissolved in water. The solid content mass ratio [(Ws)/(Vs)] is more preferably 0.16 to 0.28, still more preferably 0.18 to 0.25.

In the chemical conversion treatment layer 13 of the surface-treated steel sheet 1 according to the present embodiment, when t is a thickness of the chemical conversion treatment layer, an area starting from a surface of the chemical conversion treatment layer 13 and ending at a position of t/10 from the surface of the chemical conversion treatment layer 13 in a thickness direction is a surface layer region 101, an area starting from the position of 9t/10 from the surface of the chemical conversion treatment layer 13 in the thickness direction and ending at an interface between the chemical conversion treatment layer 13 and the zinc-based plated layer 12 is an interface side region 102, and a region sandwiched between the surface layer region and the interface side region is the intermediate region 103, a maximum value of a P concentration of the surface layer region 101 is 1.5 times to 5.0 times the average P concentration of an intermediate region 103.

A surface that is unlikely to be stained with fingerprints can be formed by segregating P in a surface layer region of the chemical conversion treatment layer 13 to adjust surface free energy. (Fingerprint resistance is improved.)

If the maximum value of the P concentration in the surface layer region 101 is less than 1.5 times the average P concentration of the intermediate region 103, fingerprint resistance becomes insufficient. Preferably, the maximum value of the P concentration in the surface layer region 101 is not less than 2.0 times the average P concentration in the intermediate region 103. In this case, fingerprint resistance can be further improved.

On the other hand, if the maximum value of the P concentration in the surface layer region is more than 5.0 times the average P concentration in the intermediate region, a brittle phosphorus compound is formed on the surface, so that powdering occurs during press processing, which is not preferable as a steel sheet including a zinc-based plated layer.

Further, in the chemical conversion treatment layer 13 of the surface-treated steel sheet 1 according to the present embodiment, it is preferable that Al is present in the interface side region 102, and the F content (concentration) of the interface side region 102 is 20% or more of the F content (concentration) of the entire chemical conversion treatment layer 13.

The fact that Al is present in the interface side region 102 of the chemical conversion treatment layer 13 and F is concentrated in the above-described range indicates that Al and F form a complex salt. The complex salt is hardly soluble, and hardly permeable to corrosive factors from the outside. Thus, when such a complex salt is formed, the flat sheet corrosion resistance of the surface-treated steel sheet is improved, so that the generation of white rust is suppressed.

When Al is not present in the interface side region 102 or the F content of the interface side region 102 is less than 20% of the F content of the entire chemical conversion treatment layer 13, the above-described effect cannot be obtained to a sufficient extent. The upper limit is not limited, but even if the F content of the interface region 102 is increased over a certain level, further enhancement of the effect is not obtained and economic efficiency is deteriorated because F that does not form a complex salt with Al increases in a case where the content of F becomes excessively high with respect to Al. Therefore, the content of F may be, for example, 60% or less.

In addition, it is preferable that Sb is present (contained) in the interface side region 102 in the chemical conversion treatment layer 13 of the surface-treated steel sheet 1 according to the present embodiment. In this case, blackening of the surface-treated steel sheet can be suppressed (blackening resistance is improved). The mechanism thereof is unknown, but may be similar to a mechanism in which flush treatment with Co or the like contributes to prevention of blackening of the surface-treated steel sheet.

For the surface-treated steel sheet according to the present embodiment, whether the chemical conversion treatment layer contains the elements of Si, C, O, P and F, the ratio of the maximum value of the P concentration of the surface layer region to the average P concentration of the intermediate region, the ratio of the F content of the surface layer region to the F content of the entire chemical conversion treatment layer, and the presence or absence of Al and Sb in the interface side region are determined by EDS linear analysis.

Specifically, by a cryogenic focused ion beam (FIB) method, a test piece is cut out from a zinc-based plated steel sheet on which a chemical conversion treatment layer is formed, and a cross section structure of the obtained test piece is observed with a transmission electron microscope (TEM) at a magnification which allows the entire chemical conversion treatment layer to fall within the observed visual field. For identifying the constituent elements of each layer, line analysis is performed along the thickness direction by TEM-EDS (energy dispersive X-ray spectroscopy), and quantitative analysis of the chemical composition at each site is performed. The method of the line analysis is not particularly limited, and continuous point analysis with an interval of several nm between points may be performed, or an element map in an arbitrary region may be measured to determine the thickness-direction distribution of the element in terms of the average in a plane direction.

The values of the C concentration, the O concentration, the Si concentration and the P concentration in the chemical conversion treatment layer are each determined as the average of the line analysis results for the entire chemical conversion treatment layer.

As the maximum value of the P concentration of the surface layer region, the largest value among the concentrations obtained by performing line analysis of the surface layer region in the thickness direction is adopted.

Each of the F content of the interface side region and the F content of the entire chemical conversion treatment layer is "average F concentration of observed region (layer)"× "volume of the region (layer)", respectively. (The volume of the interface side region is 1/10 of that of the entire chemical conversion treatment layer.)

In the interface side region, line analysis is performed in the thickness direction. It is determined that Al is present if the average Al concentration is 0.10 mass % or more, and it is determined that Sb is present if the maximum value of the Sb concentration is 0.01 mass % or more.

The apparatus used for the analysis is not particularly limited, and for example, TEM (electrolysis emission transmission electron microscope: JEM-2100F manufactured by JEOL Ltd.) or EDS (JED-2300T manufactured by JEOL Ltd.) may be used.

The thickness of the chemical conversion treatment layer 13 of the surface-treated steel sheet 1 according to the present embodiment is preferably 10 to 2000 nm. A thickness of less than 10 nm is not preferable because there is a possibility that a surface of the steel cannot be covered, and thus sufficient corrosion resistance cannot be obtained. On the other hand, a thickness of more than 2000 nm is not preferable because black deposit resistance during processing decreases. The thickness is more preferably 200 to 800 nm.

The thickness of the chemical conversion treatment layer can be measured by observing a cross section using IEM.

The interface between the plated layer and the chemical conversion treatment layer is identified by observation of the cross sectional with the TEM, and the thickness from this interface to the surface of the chemical conversion treatment layer is defined as a thickness of the chemical conversion treatment layer.

<Manufacturing Method>

Next, a preferred manufacturing method for the surface-treated steel sheet according to the present embodiment will be described.

As long as the surface-treated steel sheet according to the present embodiment has the above-described characteristics, the effects thereof can be obtained regardless of a manufacturing method, the manufacturing method described below is preferable because it enables stable manufacture.

That is, the surface-treated steel sheet according to the present embodiment can be manufactured by a manufacturing method including the following steps.

(I) a plating step of forming a zinc-based plated layer on a surface of a steel (steel sheet) by immersing the steel in a plating bath containing Zn;

(II) a step of applying a surface treatment metal agent (treatment solution) to a steel including a zinc-based plated layer;

(III) a heating step of heating the steel sheet, to which the surface treatment metal agent is applied, to form a chemical conversion treatment layer containing Si, C. O and P; and (IV) a cooling step of cooling the steel sheet after the heating step.

Hereinafter, preferred conditions for each step will be described.

[Plating Step]

There is no particular limitation on the plating step. The plating may be performed by a normal hot-dip galvanizing method so as to obtain sufficient plating adhesion.

In addition, there is no particular limitation on the manufacturing method for the steel that is subjected to the plating step.

The manufacturing method may be a manufacturing method for a zinc-plated steel sheet as specified in JIS G 3302: 2019 or a manufacturing method for a plated steel sheet as specified in JIS G 3323: 2019.

Since the composition of the plating bath is substantially equal to the composition of the plated layer, the composition of the plating bath may be adjusted according to the composition of a desired zinc-based plated layer. For regular spangle-finishing a surface of the plated layer, it is preferable that the plating bath contains Sb at 0.03 to 0.15 mass %.

[Application Step]

In the application step, a surface treatment metal agent (treatment solution) is applied to the steel sheet after the plating step (steel sheet including a zinc-based plated layer) using a roll coater or the like.

The surface treatment metal agent contains an organosilicon compound (V), which is a compound containing Si, C and O, as a film-forming component. The organosilicon compound is not particularly limited, and is obtained by, for example, blending a silane coupling agent (A) containing one amino group in the molecule and a silane coupling agent (B) containing one glycidyl group in the molecule at a solid content mass ratio [(A)/(B)] of 0.5 to 1.7.

The blending ratio between the silane coupling agent (A) and the silane coupling agent (B) is preferably 0.5 to 1.7 in terms of a solid content ratio [(A)/(B)]. A solid content ratio [(A)/(B)] of less than 0.5 is not preferable because bath stability and black deposit resistance may be significantly deteriorated. On the other hand, a solid content ratio [(A)/(B)] of more than 1.7 is not preferable because water resistance may significantly decrease.

The surface treatment metal agent contains a P compound (phosphorus compound) (W) as an inhibitor component. The phosphorus compound (W) is not particularly limited, and examples thereof include phosphoric acid, ammonium phosphate, potassium phosphate, and sodium phosphate.

For the blending amount of the phosphorus compound (W), the solid content mass ratio between Si derived from the organosilicon compound (V) and P derived from the phosphorus compound (W), [(Ws)/(Vs)], is preferably 0.15 to 0.31. It is not preferable that the solid content mass ratio between Si derived from the organosilicon compound (V) and P derived from the phosphorus compound (W), [(Ws)/(Vs)], is less than 0.15 because good corrosion resistance cannot be obtained due to the shortage of the inhibitor component. On the other hand, a solid content mass ratio [(Ws)/(Vs)] of more than 0.31 is not preferable because the film (chemical conversion treatment layer) is significantly dissolved in water, so that good corrosion resistance cannot be obtained.

The solid content of the surface treatment metal agent is 3.0 to 15.0 mass %. If the solid content of the surface treatment metal agent is less than 3.0 mass %, corrosion resistance decreases. The reason for this is unknown, but may be that water remains in the chemical conversion treatment layer (film), so that the barrier property of the film is deteriorated. On the other hand, if the solid content of the surface treatment metal agent is more than 15.0 mass %, it is difficult to segregate P of the surface layer region. The reason for this is unknown, but may be that a compound contained in the surface treatment metal agent and containing Si, C and O suppresses movement of P in the surface treatment metal agent.

It is preferable to use the surface treatment metal agent within 72 hours after the organosilicon compound (V), which is a compound containing Si, C and O, and the P compound (phosphorus compound) (W) are mixed. After more than 72 hours, the effect of segregating P in the surface layer region decreases. The reason for this is unknown, but may be that the organosilicon compound (V) and the P compound (phosphorus compound) (W) contained in the surface treatment metal agent react with each other, so that movement of P in the surface-treated metal agent is suppressed.

For performing control so that a complex salt of Al and F is formed in the interface side region of the chemical conversion treatment layer, it is preferable that Al is contained in the zinc-based plated layer, and a fluorine compound (X) is contained in the surface treatment metal agent. When the fluorine compound is contained, Al on the plated surface is dissolved, and Al and F react with each other, so that a hardly soluble salt is formed in the interface side region of the chemical conversion treatment layer.

Examples of the fluorine compound include hydrogen fluoride.

For the blending amount of the fluorine compound (X), the concentration of F derived from the fluorine compound (X) contained in the surface treatment agent is preferably 0.03 to 4.50 mass %. If the blending amount of the fluorine compound (X) is less than 0.03 mass %, the amount of dissolution of Al on the plating surface is insufficient, so that a hardly soluble salt obtained by reaction between Al and F is not formed, and thus it is difficult to obtain the effect of improving corrosion resistance. If the blending amount of the fluorine compound (X) is more than 4.50 mass %, Al is excessively dissolved on the plated surface, so that the external appearance is deteriorated.

For the blending amount of the fluorine compound (X), the solid content mass ratio between Si derived from the organosilicon compound (V) and F derived from the fluorine compound (X), [(Xs)/(Vs)], is preferably 0.01 to 0.30. If the solid content mass ratio between Si derived from the organosilicon compound (V) and F derived from the fluorine compound (X), [(Xs)/(Vs)], is less than 0.01, the effect of improving corrosion resistance cannot be obtained to a sufficient extent. On the other hand, a solid content mass ratio [(Xs)/(Vs)] of more than 0.30 is not preferable because the chemical conversion treatment layer is significantly dissolved in water.

The surface treatment metal agent may contain a Zr compound (Y). The Zr compound (Y) is not particularly limited, and examples thereof include ammonium zirconium carbonate, hexafluorozirconium hydroacid, and ammonium zirconium hexafluoride.

For the blending amount of the Zr compound (Y), the solid content mass ratio between Si derived from the organosilicon compound (V) and Zr derived from the Zr compound (Y), [(Ys)/(Vs)], is preferably 0.06 to 0.15. If the solid content mass ratio between Si derived from the organosilicon compound (V) and the Zr derived from the Zr compound (Y), [(Ys)/(Vs)], is less than 0.06, the effect of improving corrosion resistance is insufficient. On the other hand, a solid content mass ratio [(Ys)/(Vs)] of more than 0.15 does not lead to further enhancement of the effect of improving corrosion resistance.

The surface treatment metal agent may contain a V compound (Z). The V compound (Z) is not particularly limited, and examples thereof include vanadium pentoxide $V_2O_5$, metavanadate $HVO_3$, ammonium metavanadate, sodium metavanadate, vanadium oxytrichloride $VOCl_3$, vanadium trioxide $V_2O_3$, vanadium dioxide $VO_2$, vanadium oxysulfate $VOSO_4$, vanadium oxyacetylacetonate $VO(OC(=CH_2)CH_2COCH_3)_2$, vanadium acetylacetonate $V(OC(=CH_2)CH_2COCH_3)_3$, vanadium trichloride $VCl_3$, and lin-vanadomolybdic acid. It is also possible to use compounds obtained by reducing a pentavalent vanadium compound to tetravalence to divalence with an organic compound having at least one functional group selected from the group consisting of a hydroxyl group, a carbonyl group, carboxylic acid, a primary to tertiary amino group, an amide group, a phosphoric acid group and a phosphonic acid group.

For the blending amount of the V compound (Z), the solid content mass ratio between Si derived from the organosilicon compound (V) and V derived from the V compound (Z), $[(Zs)/(Vs)]$, is preferably 0.05 to 0.17. If the solid content mass ratio between Si derived from the organosilicon compound (V) and V derived from the V compound (Z), $[(Zs)/(Vs)]$, is less than 0.05, the effect of improving corrosion resistance cannot be obtained to a sufficient extent. On the other hand, a solid content mass ratio $[(Zs)/(Vs)]$ of more than 0.17 is not preferable because bath stability is deteriorated.

For performing control so that Sb is present in the interface side region of the chemical conversion treatment layer, it is preferable that Sb is contained in the zinc-based plated layer, hydrogen fluoride is contained in the surface treatment metal agent, and the pH of the surface treatment metal agent is set to 1 to 5. When hydrogen fluoride is contained in the surface treatment agent to set the pH of the surface treatment metal agent to 1 to 5, Sb in the zinc-based plated layer is eluted in the surface treatment metal agent, and moves to the interface side region of the chemical conversion treatment layer.

For setting the pH to 1 to 5, a pH adjuster may be incorporated in the surface treatment metal agent. The pH adjuster is not particularly limited, and organic acids such as formic acid, acetic acid and lactic acid, ammonium salts, amines, and the like may be used.

[Heating Step and Cooling Step]

In the heating step, the steel sheet, to which a surface treatment metal agent is applied is heated and dried with a drying furnace or the like to form a chemical conversion treatment layer on a surface thereof.

In the heating step, P can be segregated in the surface layer region of the chemical conversion treatment layer by heating the surface treatment metal agent at an appropriate temperature rising rate. The reason for this is unknown, but may be that in the process of forming the chemical conversion treatment layer, P moves to a chemical conversion treatment layer-non-formed portion due to poor compatibility between a film containing Si, O and C and P in the process of forming the chemical conversion treatment layer.

For segregating P, it is necessary that the temperature rising rate be 10 to 150° C./sec until the temperature reaches 55° C., which is a temperature at which the surface treatment metal agent is dried to form the chemical conversion treatment layer, after application at room temperature. If the temperature rising rate is more than 150° C./sec, the movement of P becomes insufficient, so that the P concentration in the surface layer region cannot be sufficiently increased. On the other hand, if the temperature rising rate is less than 10° C./sec, the amount of movement of P increases, so that the P concentration of the surface layer region becomes excessive.

In the heating step, a layer including a complex salt of Al and F can be formed by controlling the time until formation of the chemical conversion treatment layer immediately after application of the surface treatment metal agent to concentrate F in a region on the interface side with the plated layer in the chemical conversion treatment layer if the surface treatment metal agent contains hydrogen fluoride.

The time from application of the surface treatment metal agent to formation of the chemical conversion treatment layer immediately is preferably 1.0 to 10.0 seconds. If the time until formation of the chemical conversion treatment layer is less than 1.0 seconds, a complex salt of Al and F is hardly formed, so that it is not possible to obtain F-concentrated layer sufficient for improving corrosion resistance. On the other hand, if the time until formation of the chemical conversion treatment layer is more than 10.0 seconds, the surface layer of the plated layer is excessively etched by hydrogen fluoride, resulting in deterioration of the external appearance of the steel sheet after chemical conversion treatment.

EXAMPLES

A cold-rolled steel sheet having a sheet thickness of 0.8 mm and satisfying the provision of JIS G 3141: 2017 was immersed in a plating bath having a composition shown in Table 1, thereby obtaining a plated steel sheet whose thickness is shown in Table 8. In Table 1, for example, "Zn-0.2% Al" indicates a composition having Al of 0.2 mass % with the remainder of Zn and impurities. For a to g, a hot-dip plating method was applied, and for h, an electro plating method was applied.

In addition, a silicon compound (silane coupling agent), a phosphorus compound (P compound), a fluorine compound (F compound), a zirconium compound (Zr compound) and a vanadium compound (V compound) shown in Tables 2 to 6 were mixed in proportions shown in Table 7, thereby preparing aqueous surface treatment metal agents.

The surface treatment metal agent was applied to the plated steel sheet by a roll coater, and dried to by heating to 55° C. to form a chemical conversion treatment layer. Here, the combinations of the plated steel sheet, the surface treatment metal agent and the application and drying conditions were as shown in Tables 10-1 to 10-12.

In this way, surface-treated steel sheets Nos. 1 to 171 were manufactured.

For the obtained surface-treated steel sheet, fingerprint resistance, powdering resistance, corrosion resistance, the external appearance and blackening resistance were evaluated in the following manner.

<Fingerprint Resistance>

Vaseline (registered trademark) was applied to a surface of the flat sheet test piece, and left standing for 10 minutes, the Vaseline (registered trademark) was then removed, and a color difference ($\Delta E$) before and after the application of the Vaseline (registered trademark) was measured using a spectrophotometric colorimeter (SC-T45 manufactured by Suga Test Instruments Co., Ltd.). Here, the evaluation criteria are as follows. A sample meeting ⊙+, ⊙ or ○ was rated as being excellent in fingerprint resistance.

⊙+: $\Delta E \leq 0.5$
⊙: $0.5 < \Delta E \leq 1$
○: $1 < \Delta E \leq 2$
x: $\Delta E > 2$ <Powdering Resistance>

A flat sheet test piece was prepared, and subjected to contact bending in accordance with JIS Z 2248: 2014, and a cellophane tape peeling test was conducted on the contact bending part. Thereafter, the cellophane tape-peeled part was observed with a scanning electron microscope to evaluate the residual state of the chemical conversion treatment film. A sample meeting ○ was rated as being excellent in powdering resistance, and a sample meeting Δ was rated as being acceptable in practical use.

<Evaluation Criteria>

○: Either cracking or peeling is not observed in the chemical conversion treatment film.

Δ: Cracking is observed, but peeling is not observed in the chemical conversion treatment film.

x: Peeling of chemical conversion treatment film is recognized.

<Corrosion Resistance (White Rust Resistance)>

A flat sheet test piece was prepared, and a salt water spray test conforming to JIS Z 2371: 2015 was conducted on each test piece to evaluate the state of generation of white rust on the surface after 144 hours (ratio of the white rust generation area to the area of the test piece). A sample meeting Δ was rated as having corrosion resistance sufficient for practical use, a sample meeting ○ was rated as being excellent in corrosion resistance, and a sample meeting ⊙ was rated as being further excellent in corrosion resistance.

<Evaluation Criteria>

⊙=Rust is generated over less than 5% of the total area.

○=Rust is generated over 5% or more and less than 10% of the total area.

Δ=Rust is generated over 10% or more and less than 30% of the total area.

x=Rust is generated over 30% or more of the total area.

<External Appearance>

The external appearance of the flat sheet test piece was visually evaluated on the basis of the following criteria. A sample meeting ○ was rated as being excellent in external appearance.

<Evaluation Criteria>

○: Whitening is not observed.

Δ: Local whitening is recognized.

<Blackening Resistance>

The test sheet was held in a wet box at a temperature of 70° C. and a relative humidity of 80% for 6 days, and then taken out, and a blackening state of the test sheet was visually evaluated.

The evaluation criteria are as follows. A sample meeting ○ was rated as being acceptable, and a sample meeting ⊙ was rated as being particularly excellent in blackening resistance.

⊙=The area fraction of blackened portions is less than 1%.

○=The area fraction of blackened portions is 1% or more and less than 25%.

Δ=The area fraction of blackened portions is 25% or more and less than 50%.

x=The area fraction of blackened portions is 50% or more.

TABLE 1

|   | Plating composition | Spangle |
|---|---|---|
| a | Zn—0.2% Al | Minimized spangle |
| b | Zn—0.2% Al—0.08% Sb | Regular spangle |
| c | Zn—6.0% Al—3.0% Mg | None |
| d | Zn—11.0% Al—3.0% Mg—0.2% Si | None |
| e | Zn—16.0% Al—6.0% Mg—0.2% Si | None |
| f | Zn—19.0% Al—6.0% Mg—1.5% Sn—0.5% Ca—0.2% Si | None |
| g | Zn—24.0% Al—12.0% Mg—0.5% Ca—1.2% Si | None |
| h | Zn | None |

TABLE 2

| | Name |
|---|---|
| A1 | 3-Aminopropyltrimethoxysilane |
| A2 | 3-Aminopropyltriethoxysilane |
| B1 | 3-Glycidoxypropyltrimethoxysilane |
| B2 | 3-Glycidoxypropyltriethoxysilane |

TABLE 3

| | Name |
|---|---|
| W1 | Phosphoric acid |
| W2 | Ammonium phosphate |

TABLE 4

| | Name |
|---|---|
| X1 | Hydrogen fluoride |

TABLE 5

| | Name |
|---|---|
| Y1 | Ammonium zirconium carbonate |
| Y2 | Hexafluorozirconium hydroacid |

TABLE 6

| | Name |
|---|---|
| Z1 | Vanadium oxysulfate $VOSO_4$ |
| Z2 | Vanadium oxyacetylacetonate $VO(OC(=CH_2)CH_2COCH_3)$ |

TABLE 7

| | Organosilicon compound (V) | | | P compound (W) | | F compound (X) | | F concentration in treatment solution mass % | Zr compound (Y) | | V Compound (Z) | | Solid content (mass %) | pH |
|---|---|---|---|---|---|---|---|---|---|---|---|---|---|---|
| | Silane coupling agent | | Proportion | | Proportion | | Proportion | | | | Proportion | | Proportion | | |
| No. | A | B | A/B | Type | Ws/Vs | Type | Xs/Vs | | Type | Ys/Vs | Type | Zs/Vs | | |
| ST1 | A1 | B1 | 1.0 | W1 | 0.17 | — | — | — | — | — | — | — | 3.0 | 5.5 |
| ST2 | A1 | B2 | 0.7 | W2 | 0.20 | — | — | — | — | — | — | — | 6.7 | 8.5 |
| ST3 | A2 | B1 | 1.3 | W1 | 0.30 | — | — | — | — | — | — | — | 8.3 | 5.5 |
| ST4 | A2 | B2 | 1.5 | W2 | 0.16 | — | — | — | — | — | — | — | 11.5 | 7.8 |
| ST5 | A1 | B1 | 1.3 | W1 | 0.16 | X1 | 0.02 | 0.11 | — | — | — | — | 5.6 | 5.2 |
| ST6 | A1 | B2 | 1.4 | W2 | 0.20 | X1 | 0.28 | 1.90 | — | — | — | — | 6.8 | 8.2 |
| ST7 | A2 | B1 | 0.6 | W1 | 0.20 | X1 | 0.25 | 1.97 | — | — | — | — | 7.9 | 5.3 |
| ST8 | A2 | B2 | 0.7 | W2 | 0.20 | X1 | 0.15 | 1.53 | — | — | — | — | 10.2 | 8.0 |
| ST9 | A1 | B1 | 0.8 | W2 | 0.18 | — | — | — | — | — | — | — | 11.5 | 3.5 |
| ST10 | A1 | B2 | 1.1 | W1 | 0.27 | — | — | — | — | — | — | — | 12.8 | 3.4 |
| ST11 | A2 | B1 | 1.3 | W2 | 0.16 | — | — | — | — | — | — | — | 4.5 | 2.4 |
| ST12 | A2 | B2 | 1.5 | W1 | 0.16 | — | — | — | — | — | — | — | 4.5 | 4.5 |
| ST13 | A1 | B1 | 1.0 | W1 | 0.18 | X1 | 0.04 | 0.14 | — | — | — | — | 3.6 | 2.3 |
| ST14 | A1 | B2 | 1.0 | W2 | 0.27 | X1 | 0.04 | 0.22 | — | — | — | — | 5.5 | 1.5 |
| ST15 | A2 | B1 | 0.9 | W1 | 0.27 | X1 | 0.05 | 0.43 | — | — | — | — | 8.6 | 4.8 |
| ST16 | A2 | B2 | 0.9 | W2 | 0.27 | X1 | 0.28 | 1.87 | — | — | — | — | 6.7 | 3.5 |
| ST17 | A1 | B1 | 0.8 | W1 | 0.20 | X1 | 0.04 | 0.30 | Y1 | 0.10 | — | — | 7.7 | 1.3 |
| ST18 | A1 | B2 | 0.6 | W2 | 0.21 | X1 | 0.04 | 0.29 | — | — | Z2 | 0.07 | 7.3 | 2.8 |
| ST19 | A2 | B1 | 1.6 | W1 | 0.23 | X1 | 0.05 | 0.50 | Y1 | 0.14 | Z1 | 0.06 | 10.1 | 4.9 |
| ST20 | A2 | B2 | 1.3 | W2 | 0.24 | X1 | 0.28 | 3.38 | Y2 | 0.07 | Z2 | 0.16 | 12.1 | 3.4 |
| ST21 | A1 | B1 | 1.5 | W2 | 0.27 | — | — | — | — | — | — | — | 1.5 | 7.5 |
| ST22 | A2 | B2 | 0.6 | W2 | 0.25 | — | — | — | — | — | — | — | 1.8 | 7.7 |
| ST23 | A2 | B1 | 1.1 | W2 | 0.16 | — | — | — | — | — | — | — | 18.0 | 7.8 |
| ST24 | A2 | B2 | 1.3 | W1 | 0.28 | — | — | — | — | — | — | — | 23.0 | 5.3 |
| ST25 | A2 | B1 | 1.2 | W2 | 0.02 | X1 | 0.02 | 0.14 | — | — | — | — | 3.1 | 6.3 |
| ST26 | A1 | B2 | 1.3 | W1 | 0.45 | X1 | 0.28 | 2.30 | — | — | — | — | 14.0 | 6.4 |
| ST27 | A2 | B1 | 1.2 | W2 | 0.15 | X1 | 0.02 | 0.01 | — | — | — | — | 3.1 | 6.3 |
| ST28 | A1 | B2 | 1.3 | W1 | 0.17 | X1 | 0.28 | 4.80 | — | — | — | — | 14.0 | 6.4 |
| ST29 | A1 | B1 | 1.1 | W1 | 0.03 | — | — | — | — | — | — | — | 3.6 | 2.3 |
| ST30 | A2 | B2 | 0.7 | W2 | 0.12 | — | — | — | — | — | — | — | 6.7 | 3.5 |

TABLE 8

| No. | Sheet thickness (mm) | Plating Type | Thickness (g/m²) | Spangle |
|---|---|---|---|---|
| O1 | 0.8 | a | 90 | Minimized spangle |
| O2 | 0.8 | b | 90 | Regular spangle |
| O3 | 0.8 | c | 90 | None |
| O4 | 0.8 | d | 90 | None |
| O5 | 0.8 | e | 90 | None |
| O6 | 0.8 | f | 90 | None |
| O7 | 0.8 | g | 90 | None |
| O8 | 0.8 | h | 30 | None |

TABLE 9

| No. | Application conditions Film adhesion amount (nm) | Drying step Temperature rising rate (° C./sec) | Time until formation of chemical conversion treatment layer after application (sec) |
|---|---|---|---|
| C1 | 20 | 30 | 2.1 |
| C2 | 50 | 100 | 5.2 |
| C3 | 80 | 140 | 8.5 |
| C4 | 300 | 15 | 9.3 |
| C5 | 450 | 50 | 7.1 |
| C6 | 600 | 120 | 4.2 |
| C7 | 750 | 145 | 1.5 |
| C8 | 1000 | 20 | 7.8 |
| C9 | 1500 | 80 | 5.0 |
| C10 | 1800 | 130 | 2.5 |
| C11 | 300 | 1 | 2.3 |
| C12 | 450 | 3 | 4.5 |
| C13 | 800 | 5 | 7.2 |
| C14 | 900 | 7 | 8.1 |
| C15 | 50 | 180 | 1.5 |
| C16 | 250 | 200 | 2.8 |
| C17 | 500 | 220 | 5.0 |
| C18 | 750 | 250 | 9.7 |
| C19 | 70 | 140 | 0.1 |
| C20 | 400 | 100 | 0.8 |
| C21 | 850 | 60 | 0.2 |
| C22 | 1850 | 20 | 0.9 |
| C23 | 70 | 140 | 11.0 |
| C24 | 400 | 100 | 18.9 |
| C25 | 850 | 60 | 13.8 |
| C26 | 1850 | 20 | 25.5 |

TABLE 10-1

| | Manufacture conditions | | | | Analysis | | | |
|---|---|---|---|---|---|---|---|---|
| No. | Base sheet under test | Surface treatment metal agent | Time (h) until application/drying after preparation of surface treatment metal agent | Conditions for application/drying of surface treatment metal agent | Si content (mass %) | C content (mass %) | O content (mass %) | P content (mass %) |
| 1 | O2 | ST1 | 58 | C1 | 12.3 | 36.0 | 22.1 | 2.1 |
| 2 | O2 | ST2 | 48 | C2 | 11.5 | 29.9 | 19.0 | 2.0 |
| 3 | O2 | ST3 | 68 | C3 | 17.2 | 22.8 | 22.9 | 2.6 |
| 4 | O2 | ST4 | 131 | C4 | 15.7 | 29.8 | 18.7 | 3.2 |
| 5 | O2 | ST1 | 34 | C5 | 14.1 | 21.8 | 21.9 | 2.9 |
| 6 | O2 | ST2 | 147 | C6 | 13.0 | 26.0 | 29.5 | 2.3 |
| 7 | O2 | ST3 | 84 | C7 | 11.4 | 29.6 | 24.1 | 2.8 |
| 8 | O2 | ST4 | 46 | C8 | 11.3 | 26.6 | 27.6 | 2.0 |
| 9 | O2 | ST1 | 6 | C9 | 12.4 | 27.1 | 33.7 | 2.4 |
| 10 | O2 | ST2 | 20 | C10 | 16.6 | 35.8 | 19.4 | 3.1 |
| 11 | O1 | ST3 | 21 | C1 | 11.3 | 34.1 | 29.9 | 2.4 |
| 12 | O3 | ST4 | 21 | C2 | 11.7 | 26.5 | 34.8 | 2.5 |
| 13 | O4 | ST1 | 22 | C3 | 13.7 | 34.1 | 27.1 | 2.5 |
| 14 | O5 | ST2 | 55 | C4 | 11.0 | 25.4 | 26.4 | 2.6 |
| 15 | O6 | ST3 | 65 | C5 | 12.4 | 27.5 | 30.0 | 1.9 |
| 16 | O7 | ST4 | 31 | C6 | 13.8 | 28.4 | 25.2 | 3.0 |
| 17 | O1 | ST1 | 41 | C11 | 17.2 | 30.2 | 25.7 | 4.1 |
| 18 | O2 | ST2 | 5 | C12 | 10.1 | 20.5 | 22.1 | 2.1 |
| 19 | O3 | ST3 | 59 | C13 | 11.7 | 27.2 | 18.8 | 2.8 |
| 20 | O4 | ST4 | 69 | C14 | 10.6 | 23.2 | 20.2 | 2.0 |
| 21 | O5 | ST1 | 37 | C11 | 14.1 | 27.1 | 25.0 | 2.3 |
| 22 | O6 | ST2 | 35 | C12 | 15.9 | 25.5 | 22.4 | 2.9 |
| 23 | O7 | ST3 | 14 | C13 | 16.3 | 32.4 | 30.0 | 2.9 |
| 24 | O2 | ST4 | 60 | C14 | 15.8 | 20.7 | 27.3 | 2.8 |
| 25 | O1 | ST1 | 218 | C15 | 17.1 | 25.5 | 18.5 | 4.2 |
| 26 | O2 | ST2 | 215 | C16 | 12.2 | 22.1 | 33.7 | 2.4 |
| 27 | O3 | ST3 | 229 | C17 | 19.8 | 32.3 | 31.1 | 3.2 |
| 28 | O4 | ST4 | 215 | C18 | 12.7 | 25.5 | 19.0 | 2.6 |
| 29 | O5 | ST1 | 75 | C15 | 11.5 | 33.3 | 32.7 | 1.9 |
| 30 | O6 | ST2 | 178 | C16 | 14.5 | 29.3 | 31.9 | 3.5 |
| 31 | O7 | ST3 | 147 | C17 | 19.3 | 24.1 | 27.5 | 3.6 |
| 32 | O2 | ST4 | 110 | C18 | 17.2 | 26.7 | 18.3 | 4.0 |
| 33 | O2 | ST5 | 7 | C1 | 12.2 | 21.9 | 23.7 | 2.7 |
| 34 | O2 | ST6 | 19 | C2 | 12.0 | 21.1 | 18.5 | 2.2 |
| 35 | O2 | ST7 | 67 | C3 | 11.3 | 28.3 | 27.8 | 2.1 |
| 36 | O2 | ST8 | 158 | C4 | 17.5 | 29.9 | 26.9 | 3.5 |
| 37 | O2 | ST5 | 27 | C5 | 12.4 | 23.5 | 28.7 | 1.9 |
| 38 | O2 | ST6 | 43 | C6 | 13.6 | 32.2 | 21.1 | 2.3 |
| 39 | O2 | ST7 | 43 | C7 | 10.9 | 24.1 | 33.6 | 2.3 |
| 40 | O2 | ST8 | 29 | C8 | 10.9 | 30.2 | 33.4 | 2.4 |
| 41 | O2 | ST5 | 61 | C9 | 13.8 | 24.5 | 28.7 | 3.3 |
| 42 | O2 | ST6 | 33 | C10 | 11.8 | 25.8 | 23.0 | 2.3 |
| 43 | O1 | ST7 | 67 | C1 | 19.9 | 33.8 | 20.1 | 4.0 |
| 44 | O3 | ST8 | 8 | C2 | 17.9 | 25.6 | 25.5 | 2.8 |
| 45 | O4 | ST5 | 65 | C3 | 17.3 | 28.7 | 19.2 | 3.3 |
| 46 | O5 | ST6 | 4 | C4 | 10.3 | 22.7 | 30.8 | 1.7 |
| 47 | O6 | ST7 | 48 | C5 | 17.4 | 20.9 | 19.4 | 3.0 |
| 48 | O7 | ST8 | 29 | C6 | 12.5 | 23.5 | 20.6 | 2.0 |

TABLE 10-2

| | Manufacture conditions | | | | Analysis | | | |
|---|---|---|---|---|---|---|---|---|
| No. | Base sheet under test | Surface treatment metal agent | Time (h) until application/drying after preparation of surface treatment metal agent | Conditions for application/drying of surface treatment metal agent | Si content (mass %) | C content (mass %) | O content (mass %) | P content (mass %) |
| 49 | O1 | ST5 | 70 | C19 | 10.0 | 35.5 | 22.6 | 2.3 |
| 50 | O2 | ST6 | 12 | C20 | 11.2 | 27.1 | 32.5 | 2.4 |
| 51 | O3 | ST7 | 118 | C21 | 11.2 | 24.5 | 25.8 | 2.7 |
| 52 | O4 | ST8 | 24 | C22 | 18.6 | 26.1 | 26.3 | 2.8 |
| 53 | O5 | ST5 | 31 | C19 | 15.5 | 30.9 | 20.6 | 3.0 |
| 54 | O6 | ST6 | 71 | C20 | 13.3 | 34.4 | 30.5 | 2.3 |

TABLE 10-2-continued

| | Manufacture conditions | | | | Analysis | | | |
|---|---|---|---|---|---|---|---|---|
| | Base sheet | Surface treatment | Time (h) until application/drying after preparation of surface | Conditions for application/drying of surface | | | | |
| No. | under test | metal agent | treatment metal agent | treatment metal agent | Si content (mass %) | C content (mass %) | O content (mass %) | P content (mass %) |
| 55 | O7 | ST7 | 202 | C21 | 17.6 | 25.0 | 30.6 | 3.3 |
| 56 | O2 | ST8 | 69 | C22 | 11.1 | 28.3 | 24.3 | 2.0 |
| 57 | O1 | ST5 | 34 | C23 | 16.6 | 24.5 | 24.4 | 3.3 |
| 58 | O2 | ST6 | 20 | C24 | 19.6 | 22.3 | 23.3 | 3.5 |
| 59 | O3 | ST7 | 38 | C25 | 11.2 | 33.9 | 23.9 | 1.9 |
| 60 | O4 | ST8 | 52 | C26 | 14.0 | 25.6 | 30.7 | 2.4 |
| 61 | O5 | ST5 | 65 | C23 | 15.9 | 36.8 | 18.9 | 3.8 |
| 62 | O6 | ST6 | 29 | C24 | 15.6 | 23.1 | 17.6 | 2.7 |
| 63 | O7 | ST7 | 149 | C25 | 17.9 | 25.9 | 20.9 | 4.3 |
| 64 | O2 | ST8 | 45 | C26 | 10.9 | 34.8 | 24.4 | 1.7 |
| 65 | O2 | ST9 | 180 | C1 | 12.3 | 32.8 | 30.1 | 2.8 |
| 66 | O2 | ST10 | 26 | C2 | 19.9 | 35.0 | 32.8 | 4.3 |
| 67 | O2 | ST11 | 45 | C3 | 11.6 | 22.5 | 27.3 | 2.8 |
| 68 | O2 | ST12 | 5 | C4 | 15.5 | 36.5 | 25.6 | 2.9 |
| 69 | O2 | ST9 | 20 | C5 | 11.7 | 20.8 | 30.8 | 1.9 |
| 70 | O2 | ST10 | 209 | C6 | 19.2 | 33.2 | 30.4 | 3.8 |
| 71 | O2 | ST11 | 37 | C7 | 15.4 | 31.4 | 22.5 | 2.7 |
| 72 | O2 | ST12 | 27 | C8 | 17.9 | 24.3 | 20.7 | 4.2 |
| 73 | O2 | ST9 | 57 | C9 | 15.6 | 28.3 | 23.9 | 2.4 |
| 74 | O2 | ST10 | 113 | C10 | 16.6 | 36.0 | 25.0 | 2.6 |
| 75 | O2 | ST11 | 39 | C1 | 10.7 | 31.2 | 25.1 | 2.4 |
| 76 | O2 | ST12 | 52 | C2 | 19.0 | 22.1 | 21.5 | 3.4 |
| 77 | O2 | ST9 | 47 | C3 | 18.3 | 20.1 | 21.8 | 3.0 |
| 78 | O2 | ST10 | 40 | C4 | 14.0 | 24.0 | 19.6 | 2.5 |
| 79 | O2 | ST11 | 20 | C5 | 13.2 | 32.9 | 23.9 | 2.4 |
| 80 | O2 | ST12 | 29 | C6 | 11.5 | 25.8 | 24.5 | 2.1 |
| 81 | O2 | ST13 | 111 | C1 | 12.2 | 25.7 | 20.7 | 2.4 |
| 82 | O2 | ST14 | 47 | C2 | 19.1 | 28.3 | 22.8 | 3.4 |
| 83 | O2 | ST15 | 38 | C3 | 18.7 | 22.2 | 27.6 | 4.6 |
| 84 | O2 | ST16 | 223 | C4 | 11.7 | 27.2 | 30.7 | 2.6 |
| 85 | O2 | ST13 | 12 | C5 | 12.0 | 22.9 | 28.7 | 2.5 |
| 86 | O2 | ST14 | 67 | C6 | 13.7 | 29.0 | 26.3 | 2.3 |
| 87 | O2 | ST15 | 202 | C7 | 17.8 | 31.2 | 32.0 | 4.2 |
| 88 | O2 | ST16 | 1 | C8 | 15.6 | 26.9 | 21.6 | 3.2 |
| 89 | O2 | ST13 | 67 | C9 | 14.4 | 35.6 | 34.2 | 3.2 |
| 90 | O2 | ST14 | 31 | C10 | 14.4 | 22.1 | 33.2 | 2.4 |
| 91 | O2 | ST15 | 51 | C1 | 11.1 | 27.4 | 29.0 | 1.9 |
| 92 | O2 | ST16 | 61 | C2 | 13.1 | 20.3 | 30.3 | 2.0 |
| 93 | O2 | ST13 | 48 | C3 | 15.9 | 32.3 | 33.9 | 2.7 |
| 94 | O2 | ST14 | 3 | C4 | 19.4 | 35.3 | 19.3 | 4.6 |
| 95 | O2 | ST15 | 16 | C5 | 15.0 | 32.6 | 30.1 | 2.8 |
| 96 | O2 | ST16 | 28 | C6 | 16.2 | 29.3 | 34.5 | 3.2 |

TABLE 10-3

| | Manufacture conditions | | | | Analysis | | | |
|---|---|---|---|---|---|---|---|---|
| | Base sheet | Surface | Time (h) until application/drying after preparation of surface | Conditions for application/drying of surface | | | | |
| No. | under test | treatment metal agent | treatment metal agent | treatment metal agent | Si content (mass %) | C content (mass %) | O content (mass %) | P content (mass %) |
| 97 | O1 | ST9 | 29 | C1 | 18.0 | 21.1 | 32.2 | 2.7 |
| 98 | O3 | ST10 | 76 | C2 | 19.5 | 25.3 | 25.3 | 4.1 |
| 99 | O4 | ST11 | 211 | C3 | 19.6 | 25.9 | 21.3 | 4.1 |
| 100 | O5 | ST12 | 35 | C4 | 12.3 | 21.3 | 33.4 | 2.7 |
| 101 | O6 | ST9 | 36 | C5 | 10.3 | 28.9 | 24.4 | 1.7 |
| 102 | O7 | ST10 | 9 | C6 | 14.4 | 24.2 | 31.8 | 3.5 |
| 103 | O1 | ST11 | 33 | C7 | 15.7 | 22.4 | 29.1 | 3.5 |
| 104 | O3 | ST12 | 41 | C8 | 11.7 | 22.0 | 19.1 | 2.5 |
| 105 | O4 | ST13 | 60 | C9 | 10.0 | 29.0 | 19.0 | 2.4 |
| 106 | O5 | ST14 | 92 | C10 | 16.1 | 20.9 | 33.1 | 3.2 |
| 107 | O6 | ST15 | 16 | C1 | 10.2 | 33.9 | 32.7 | 1.9 |

TABLE 10-3-continued

| | | Manufacture conditions | | | Analysis | | | |
|---|---|---|---|---|---|---|---|---|
| No. | Base sheet under test | Surface treatment metal agent | Time (h) until application/drying after preparation of surface treatment metal agent | Conditions for application/drying of surface treatment metal agent | Si content (mass %) | C content (mass %) | O content (mass %) | P content (mass %) |
| 108 | O7 | ST16 | 12 | C2 | 18.9 | 36.9 | 23.9 | 4.1 |
| 109 | O1 | ST13 | 64 | C3 | 18.5 | 21.9 | 30.3 | 3.4 |
| 110 | O3 | ST14 | 0 | C4 | 14.7 | 35.9 | 20.8 | 2.9 |
| 111 | O4 | ST15 | 149 | C5 | 14.3 | 26.0 | 28.9 | 2.7 |
| 112 | O5 | ST16 | 57 | C6 | 15.2 | 31.3 | 33.2 | 3.4 |
| 113 | O2 | ST17 | 25 | C1 | 15.5 | 36.5 | 30.4 | 3.1 |
| 114 | O2 | ST18 | 62 | C2 | 11.0 | 22.2 | 30.8 | 2.5 |
| 115 | O2 | ST19 | 64 | C3 | 10.8 | 26.1 | 27.8 | 2.0 |
| 116 | O2 | ST20 | 51 | C4 | 13.8 | 36.5 | 28.1 | 3.1 |
| 117 | O2 | ST17 | 22 | C5 | 19.6 | 20.5 | 23.8 | 4.1 |
| 118 | O2 | ST18 | 11 | C6 | 10.7 | 34.1 | 23.7 | 1.9 |
| 119 | O2 | ST19 | 64 | C7 | 18.6 | 28.5 | 32.7 | 3.0 |
| 120 | O2 | ST20 | 41 | C8 | 11.3 | 27.2 | 30.7 | 2.3 |
| 121 | O2 | ST17 | 26 | C1 | 11.5 | 26.2 | 22.4 | 2.5 |
| 122 | O2 | ST18 | 57 | C2 | 18.3 | 24.8 | 23.1 | 3.5 |

TABLE 10-4

| | | Manufacture conditions | | | Analysis | | | |
|---|---|---|---|---|---|---|---|---|
| No. | Base sheet under test | Surface treatment metal agent | Time (h) until application/drying after preparation of surface treatment metal agent | Conditions for application/drying of surface treatment metal agent | Si content (mass %) | C content (mass %) | O content (mass %) | P content (mass %) |
| 129 | O1 | ST21 | 93 | C1 | 14.2 | 20.5 | 25.2 | 2.1 |
| 130 | O2 | ST22 | 39 | C2 | 19.6 | 21.3 | 27.2 | 3.7 |
| 131 | O3 | ST21 | 218 | C3 | 18.0 | 26.1 | 29.1 | 3.0 |
| 132 | O4 | ST22 | 48 | C4 | 19.1 | 30.6 | 26.3 | 4.6 |
| 133 | O5 | ST21 | 170 | C5 | 18.8 | 29.3 | 26.8 | 3.7 |
| 134 | O6 | ST22 | 62 | C6 | 18.4 | 31.8 | 29.9 | 3.8 |
| 135 | O7 | ST21 | 18 | C7 | 19.5 | 21.2 | 26.5 | 3.3 |
| 136 | O2 | ST22 | 41 | C8 | 12.7 | 20.3 | 18.2 | 2.5 |
| 137 | O1 | ST23 | 90 | C9 | 14.0 | 31.0 | 21.2 | 3.2 |
| 138 | O2 | ST24 | 103 | C10 | 10.2 | 30.0 | 32.1 | 1.9 |
| 139 | O3 | ST23 | 100 | C1 | 15.4 | 22.1 | 23.9 | 2.7 |
| 140 | O4 | ST24 | 168 | C2 | 15.3 | 22.9 | 18.4 | 3.0 |
| 141 | O5 | ST23 | 173 | C3 | 16.6 | 24.6 | 30.8 | 3.2 |
| 142 | O6 | ST24 | 125 | C4 | 16.0 | 22.8 | 17.7 | 3.7 |
| 143 | O7 | ST23 | 193 | C5 | 12.4 | 25.0 | 31.8 | 2.1 |
| 144 | O2 | ST24 | 208 | C6 | 10.9 | 35.8 | 17.6 | 2.3 |
| 145 | O1 | ST25 | 192 | C7 | 11.5 | 20.5 | 17.8 | 0.05 |
| 146 | O2 | ST25 | 27 | C8 | 10.2 | 35.7 | 25.5 | 0.04 |
| 147 | O3 | ST25 | 22 | C9 | 10.7 | 28.5 | 22.3 | 0.08 |
| 148 | O4 | ST25 | 27 | C10 | 15.5 | 27.2 | 31.7 | 0.02 |
| 149 | O5 | ST26 | 63 | C1 | 19.6 | 22.4 | 28.7 | 10.3 |
| 150 | O6 | ST26 | 83 | C2 | 11.3 | 26.5 | 15.5 | 10.9 |
| 151 | O7 | ST26 | 39 | C3 | 10.7 | 25.2 | 16.7 | 11.5 |
| 152 | O1 | ST26 | 47 | C4 | 12.3 | 31.9 | 28.8 | 9.8 |
| 153 | O1 | ST27 | 29 | C5 | 16.0 | 25.2 | 22.7 | 3.3 |
| 154 | O2 | ST27 | 24 | C6 | 13.2 | 26.5 | 31.8 | 3.1 |
| 155 | O3 | ST27 | 27 | C7 | 19.5 | 28.9 | 27.7 | 4.5 |
| 156 | O4 | ST27 | 70 | C8 | 17.4 | 21.6 | 34.8 | 2.8 |
| 157 | O5 | ST28 | 53 | C9 | 19.0 | 32.5 | 26.1 | 3.3 |
| 158 | O6 | ST28 | 27 | C10 | 12.7 | 28.5 | 26.0 | 2.7 |
| 159 | O7 | ST28 | 49 | C1 | 10.4 | 25.0 | 20.4 | 2.1 |
| 160 | O1 | ST28 | 34 | C2 | 16.9 | 25.8 | 24.7 | 3.7 |
| 161 | O8 | ST5 | 67 | C4 | 17.3 | 30.2 | 27.2 | 2.3 |
| 162 | O8 | ST6 | 41 | C3 | 16.9 | 33.5 | 34.5 | 3.5 |
| 163 | O8 | ST7 | 22 | C2 | 10.5 | 25.0 | 26.3 | 3.5 |
| 164 | O8 | ST8 | 163 | C1 | 21.3 | 25.7 | 18.7 | 4.7 |
| 165 | O1 | ST29 | 150 | C1 | 11.5 | 25.7 | 29.1 | 0.08 |
| 166 | O2 | ST30 | 190 | C2 | 12.3 | 23.2 | 29.9 | 0.09 |

TABLE 10-4-continued

<table>
<tr><th rowspan="3">No.</th><th colspan="4">Manufacture conditions</th><th colspan="4">Analysis</th></tr>
<tr><th>Base sheet under test</th><th>Surface treatment metal agent</th><th>Time (h) until application/drying after preparation of surface treatment metal agent</th><th>Conditions for application/drying of surface treatment metal agent</th><th>Si content (mass %)</th><th>C content (mass %)</th><th>O content (mass %)</th><th>P content (mass %)</th></tr>
<tr></tr>
<tr><td>167</td><td>O3</td><td>ST29</td><td>204</td><td>C3</td><td>11.1</td><td>20.8</td><td>26.5</td><td>0.07</td></tr>
<tr><td>168</td><td>O4</td><td>ST30</td><td>96</td><td>C4</td><td>13.2</td><td>31.5</td><td>18.2</td><td>0.08</td></tr>
<tr><td>169</td><td>O5</td><td>ST29</td><td>88</td><td>C1</td><td>13.3</td><td>30.7</td><td>32.1</td><td>0.09</td></tr>
<tr><td>170</td><td>O6</td><td>ST30</td><td>178</td><td>C2</td><td>10.5</td><td>29.3</td><td>17.3</td><td>0.07</td></tr>
<tr><td>171</td><td>O7</td><td>ST29</td><td>156</td><td>C3</td><td>10.3</td><td>30.8</td><td>26.0</td><td>0.09</td></tr>
</table>

TABLE 10-5

<table>
<tr><th rowspan="2">No.</th><th colspan="4">Analysis</th></tr>
<tr><th>Maximum value of P concentration of surface layer region/average P concentration of intermediate region</th><th>Presence or absence of Al in interface side region</th><th>Proportion of F content of interface side region (interface side region/total)</th><th>Presence or absence of Sb in interface side region</th></tr>
<tr><td>1</td><td>4.8</td><td>Present</td><td>0</td><td>None</td></tr>
<tr><td>2</td><td>3.8</td><td>Present</td><td>0</td><td>None</td></tr>
<tr><td>3</td><td>4.4</td><td>Present</td><td>0</td><td>None</td></tr>
<tr><td>4</td><td>1.5</td><td>Present</td><td>0</td><td>None</td></tr>
<tr><td>5</td><td>3.3</td><td>Present</td><td>0</td><td>None</td></tr>
<tr><td>6</td><td>1.6</td><td>Present</td><td>0</td><td>None</td></tr>
<tr><td>7</td><td>1.9</td><td>Present</td><td>0</td><td>None</td></tr>
<tr><td>8</td><td>3.0</td><td>Present</td><td>0</td><td>None</td></tr>
<tr><td>9</td><td>2.4</td><td>Present</td><td>0</td><td>None</td></tr>
<tr><td>10</td><td>3.4</td><td>Present</td><td>0</td><td>None</td></tr>
<tr><td>11</td><td>2.3</td><td>Present</td><td>0</td><td>None</td></tr>
<tr><td>12</td><td>4.5</td><td>Present</td><td>0</td><td>None</td></tr>
<tr><td>13</td><td>3.0</td><td>Present</td><td>0</td><td>None</td></tr>
<tr><td>14</td><td>4.7</td><td>Present</td><td>0</td><td>None</td></tr>
<tr><td>15</td><td>2.1</td><td>Present</td><td>0</td><td>None</td></tr>
<tr><td>16</td><td>4.5</td><td>Present</td><td>0</td><td>None</td></tr>
<tr><td>17</td><td>8.3</td><td>Present</td><td>0</td><td>None</td></tr>
<tr><td>18</td><td>6.4</td><td>Present</td><td>0</td><td>None</td></tr>
<tr><td>19</td><td>5.1</td><td>Present</td><td>0</td><td>None</td></tr>
<tr><td>20</td><td>8.1</td><td>Present</td><td>0</td><td>None</td></tr>
<tr><td>21</td><td>9.9</td><td>Present</td><td>0</td><td>None</td></tr>
<tr><td>22</td><td>9.7</td><td>Present</td><td>0</td><td>None</td></tr>
<tr><td>23</td><td>9.7</td><td>Present</td><td>0</td><td>None</td></tr>
<tr><td>24</td><td>7.9</td><td>Present</td><td>0</td><td>None</td></tr>
<tr><td>25</td><td>0.9</td><td>Present</td><td>0</td><td>None</td></tr>
<tr><td>26</td><td>0.6</td><td>Present</td><td>0</td><td>None</td></tr>
<tr><td>27</td><td>1.2</td><td>Present</td><td>0</td><td>None</td></tr>
<tr><td>28</td><td>1.3</td><td>Present</td><td>0</td><td>None</td></tr>
<tr><td>29</td><td>1.1</td><td>Present</td><td>0</td><td>None</td></tr>
<tr><td>30</td><td>1.0</td><td>Present</td><td>0</td><td>None</td></tr>
<tr><td>31</td><td>1.2</td><td>Present</td><td>0</td><td>None</td></tr>
<tr><td>32</td><td>0.5</td><td>Present</td><td>0</td><td>None</td></tr>
<tr><td>33</td><td>4.8</td><td>Present</td><td>25</td><td>None</td></tr>
<tr><td>34</td><td>3.5</td><td>Present</td><td>22</td><td>None</td></tr>
<tr><td>35</td><td>3.2</td><td>Present</td><td>28</td><td>None</td></tr>
<tr><td>36</td><td>1.7</td><td>Present</td><td>30</td><td>None</td></tr>
<tr><td>37</td><td>4.6</td><td>Present</td><td>21</td><td>None</td></tr>
<tr><td>38</td><td>2.6</td><td>Present</td><td>38</td><td>None</td></tr>
<tr><td>39</td><td>4.7</td><td>Present</td><td>45</td><td>None</td></tr>
<tr><td>40</td><td>3.6</td><td>Present</td><td>25</td><td>None</td></tr>
<tr><td>41</td><td>2.6</td><td>Present</td><td>30</td><td>None</td></tr>
<tr><td>42</td><td>4.1</td><td>Present</td><td>37</td><td>None</td></tr>
<tr><td>43</td><td>2.1</td><td>Present</td><td>39</td><td>None</td></tr>
<tr><td>44</td><td>2.4</td><td>Present</td><td>40</td><td>None</td></tr>
<tr><td>45</td><td>3.3</td><td>Present</td><td>25</td><td>None</td></tr>
<tr><td>46</td><td>3.2</td><td>Present</td><td>28</td><td>None</td></tr>
<tr><td>47</td><td>2.3</td><td>Present</td><td>30</td><td>None</td></tr>
<tr><td>48</td><td>2.8</td><td>Present</td><td>23</td><td>None</td></tr>
</table>

TABLE 10-6

<table>
<tr><th rowspan="2">No.</th><th colspan="4">Analysis</th></tr>
<tr><th>Maximum value of P concentration of surface layer region/average P concentration of intermediate region</th><th>Presence or absence of Al in interface side region</th><th>Proportion of F content of interface side region (interface side region/total)</th><th>Presence or absence of Sb in interface side region</th></tr>
<tr><td>49</td><td>3.0</td><td>Present</td><td>5</td><td>None</td></tr>
<tr><td>50</td><td>4.7</td><td>Present</td><td>7</td><td>None</td></tr>
<tr><td>51</td><td>1.8</td><td>Present</td><td>1</td><td>None</td></tr>
<tr><td>52</td><td>3.0</td><td>Present</td><td>15</td><td>None</td></tr>
<tr><td>53</td><td>4.7</td><td>Present</td><td>13</td><td>None</td></tr>
<tr><td>54</td><td>2.3</td><td>Present</td><td>8</td><td>None</td></tr>
<tr><td>55</td><td>1.6</td><td>Present</td><td>9</td><td>None</td></tr>
<tr><td>56</td><td>2.2</td><td>Present</td><td>2</td><td>None</td></tr>
<tr><td>57</td><td>4.6</td><td>Present</td><td>35</td><td>None</td></tr>
<tr><td>58</td><td>4.2</td><td>Present</td><td>38</td><td>None</td></tr>
<tr><td>59</td><td>3.6</td><td>Present</td><td>28</td><td>None</td></tr>
<tr><td>60</td><td>2.1</td><td>Present</td><td>25</td><td>None</td></tr>
<tr><td>61</td><td>3.4</td><td>Present</td><td>47</td><td>None</td></tr>
<tr><td>62</td><td>3.3</td><td>Present</td><td>23</td><td>None</td></tr>
<tr><td>63</td><td>2.0</td><td>Present</td><td>40</td><td>None</td></tr>
<tr><td>64</td><td>2.9</td><td>Present</td><td>27</td><td>None</td></tr>
<tr><td>65</td><td>1.6</td><td>Present</td><td>0</td><td>None</td></tr>
<tr><td>66</td><td>2.1</td><td>Present</td><td>0</td><td>None</td></tr>
<tr><td>67</td><td>4.5</td><td>Present</td><td>0</td><td>None</td></tr>
<tr><td>68</td><td>2.7</td><td>Present</td><td>0</td><td>None</td></tr>
<tr><td>69</td><td>2.5</td><td>Present</td><td>0</td><td>None</td></tr>
<tr><td>70</td><td>1.7</td><td>Present</td><td>0</td><td>None</td></tr>
<tr><td>71</td><td>4.1</td><td>Present</td><td>0</td><td>Present</td></tr>
<tr><td>72</td><td>2.5</td><td>Present</td><td>0</td><td>Present</td></tr>
<tr><td>73</td><td>2.8</td><td>Present</td><td>0</td><td>Present</td></tr>
<tr><td>74</td><td>1.6</td><td>Present</td><td>0</td><td>Present</td></tr>
<tr><td>75</td><td>4.6</td><td>Present</td><td>0</td><td>Present</td></tr>
<tr><td>76</td><td>3.5</td><td>Present</td><td>0</td><td>Present</td></tr>
<tr><td>77</td><td>4.1</td><td>Present</td><td>0</td><td>Present</td></tr>
<tr><td>78</td><td>2.9</td><td>Present</td><td>0</td><td>Present</td></tr>
<tr><td>79</td><td>2.8</td><td>Present</td><td>0</td><td>Present</td></tr>
<tr><td>80</td><td>4.1</td><td>Present</td><td>0</td><td>Present</td></tr>
<tr><td>81</td><td>1.9</td><td>Present</td><td>25</td><td>Present</td></tr>
<tr><td>82</td><td>4.0</td><td>Present</td><td>29</td><td>Present</td></tr>
<tr><td>83</td><td>4.5</td><td>Present</td><td>37</td><td>Present</td></tr>
<tr><td>84</td><td>1.7</td><td>Present</td><td>43</td><td>Present</td></tr>
<tr><td>85</td><td>3.5</td><td>Present</td><td>50</td><td>Present</td></tr>
<tr><td>86</td><td>4.6</td><td>Present</td><td>25</td><td>Present</td></tr>
<tr><td>87</td><td>1.6</td><td>Present</td><td>25</td><td>Present</td></tr>
<tr><td>88</td><td>3.7</td><td>Present</td><td>26</td><td>Present</td></tr>
<tr><td>89</td><td>3.2</td><td>Present</td><td>40</td><td>Present</td></tr>
<tr><td>90</td><td>3.8</td><td>Present</td><td>38</td><td>Present</td></tr>
<tr><td>91</td><td>2.4</td><td>Present</td><td>38</td><td>Present</td></tr>
<tr><td>92</td><td>4.1</td><td>Present</td><td>31</td><td>Present</td></tr>
<tr><td>93</td><td>4.6</td><td>Present</td><td>37</td><td>Present</td></tr>
<tr><td>94</td><td>4.1</td><td>Present</td><td>42</td><td>Present</td></tr>
<tr><td>95</td><td>3.3</td><td>Present</td><td>41</td><td>Present</td></tr>
<tr><td>96</td><td>2.1</td><td>Present</td><td>40</td><td>Present</td></tr>
</table>

TABLE 10-7

| | Analysis | | | |
|---|---|---|---|---|
| No. | Maximum value of P concentration of surface layer region/average P concentration of intermediate region | Presence or absence of Al in interface side region | Proportion of F content of interface side region (interface side region/total) | Presence or absence of Sb in interface side region |
| 97 | 3.6 | Present | 0 | None |
| 98 | 1.8 | Present | 0 | None |
| 99 | 1.6 | Present | 0 | None |
| 100 | 4.3 | Present | 0 | None |
| 101 | 3.8 | Present | 0 | None |
| 102 | 4.4 | Present | 0 | None |
| 103 | 4.6 | Present | 0 | None |
| 104 | 3.1 | Present | 0 | None |
| 105 | 2.4 | Present | 0 | None |
| 106 | 1.9 | Present | 0 | None |
| 107 | 3.9 | Present | 0 | None |
| 108 | 2.5 | Present | 0 | None |
| 109 | 3.7 | Present | 0 | None |
| 110 | 2.8 | Present | 0 | None |
| 111 | 1.9 | Present | 0 | None |
| 112 | 4.1 | Present | 0 | None |
| 113 | 2.5 | Present | 28 | Present |
| 114 | 2.1 | Present | 30 | Present |
| 115 | 4.5 | Present | 33 | Present |
| 116 | 4.3 | Present | 33 | Present |
| 117 | 3.7 | Present | 37 | Present |
| 118 | 3.4 | Present | 21 | Present |
| 119 | 3.3 | Present | 28 | Present |
| 120 | 2.8 | Present | 40 | Present |
| 121 | 3.1 | Present | 45 | Present |
| 122 | 4.6 | Present | 30 | Present |

TABLE 10-8

| | Analysis | | | |
|---|---|---|---|---|
| No. | Maximum value of P concentration of surface layer region/average P concentration of intermediate region | Presence or absence of Al in interface side region | Proportion of F content of interface side region (interface side region/total) | Presence or absence of Sb in interface side region |
| 129 | 1.9 | Present | 0 | None |
| 130 | 2.9 | Present | 0 | None |
| 131 | 1.8 | Present | 0 | None |
| 132 | 2.3 | Present | 0 | None |
| 133 | 1.5 | Present | 0 | None |
| 134 | 4.3 | Present | 0 | None |
| 135 | 4.2 | Present | 0 | None |
| 136 | 4.1 | Present | 0 | None |
| 137 | 0.8 | Present | 0 | None |
| 138 | 0.7 | Present | 0 | None |
| 139 | 1.3 | Present | 0 | None |
| 140 | 1.1 | Present: | 0 | None |
| 141 | 1.1 | Present | 0 | None |
| 142 | 1.2 | Present | 0 | None |
| 143 | 0.5 | Present | 0 | None |
| 144 | 0.4 | Present | 0 | None |
| 145 | 1.8 | Present | 0 | None |
| 146 | 2.5 | Present | 0 | None |
| 147 | 3.5 | Present | 0 | None |
| 148 | 3.5 | Present | 0 | None |
| 149 | 4.8 | Present | 0 | None |
| 150 | 1.6 | Present | 0 | None |
| 151 | 2.4 | Present | 0 | None |
| 152 | 4.9 | Present | 0 | None |
| 153 | 2.4 | Present | 11 | None |
| 154 | 2.1 | Present | 7 | None |
| 155 | 3.1 | Present | 5 | None |
| 156 | 2.2 | Present | 8 | None |
| 157 | 4.6 | Present | 50 | None |
| 158 | 3.0 | Present | 45 | None |
| 159 | 3.2 | Present | 48 | None |
| 160 | 3.0 | Present | 38 | None |
| 161 | 4.7 | None | 11 | None |
| 162 | 3.4 | None | 5 | None |
| 163 | 3.3 | None | 5 | None |
| 164 | 1.8 | None | 8 | None |
| 165 | 1.5 | Present | 0 | None |
| 166 | 1.7 | Present | 0.0 | None |
| 167 | 1.6 | Present | 0 | None |
| 168 | 1.5 | Present | 0 | None |
| 169 | 1.5 | Present | 0 | None |
| 170 | 1.7 | Present | 0 | None |
| 171 | 1.5 | Present | 0 | None |

TABLE 10-9

| | Quality characteristics | | | | | |
|---|---|---|---|---|---|---|
| No. | Fingerprint resistance | Powdering resistance | Corrosion resistance | External appearance | Blackening resistance | Category |
| 1 | ⊙ | ◯ | ◯ | ◯ | ◯ | Inventive Example |
| 2 | ⊙ | ◯ | ◯ | ◯ | ◯ | Inventive Example |
| 3 | ⊙ | ◯ | ◯ | ◯ | ◯ | Inventive Example |
| 4 | ◯ | ◯ | ◯ | ◯ | ◯ | Inventive Example |
| 5 | ⊙ | ◯ | ◯ | ◯ | ◯ | Inventive Example |
| 6 | ◯ | ◯ | ◯ | ◯ | ◯ | Inventive Example |
| 7 | ◯ | ◯ | ◯ | ◯ | ◯ | Inventive Example |
| 8 | ⊙ | ◯ | ◯ | ◯ | ◯ | Inventive Example |
| 9 | ⊙ | ◯ | ◯ | ◯ | ◯ | Inventive Example |
| 10 | ⊙ | ◯ | ◯ | ◯ | ◯ | Inventive Example |
| 11 | ⊙ | ◯ | ◯ | ◯ | ◯ | Inventive Example |
| 12 | ⊙ | ◯ | ◯ | ◯ | ◯ | Inventive Example |
| 13 | ⊙ | ◯ | ◯ | ◯ | ◯ | Inventive Example |

TABLE 10-9-continued

| | Quality characteristics | | | | | |
|---|---|---|---|---|---|---|
| No. | Fingerprint resistance | Powdering resistance | Corrosion resistance | External appearance | Blackening resistance | Category |
| 14 | ⊙ | ○ | ○ | ○ | ○ | Inventive Example |
| 15 | ⊙ | ○ | ○ | ○ | ○ | Inventive Example |
| 16 | ⊙ | ○ | ○ | ○ | ○ | Inventive Example |
| 17 | ⊙+ | X | ○ | ○ | ○ | Comparative Example |
| 18 | ⊙+ | X | ○ | ○ | ○ | Comparative Example |
| 19 | ⊙+ | X | ○ | ○ | ○ | Comparative Example |
| 20 | ⊙+ | X | ○ | ○ | ○ | Comparative Example |
| 21 | ⊙+ | X | ○ | ○ | ○ | Comparative Example |
| 22 | ⊙+ | X | ○ | ○ | ○ | Comparative Example |
| 23 | ⊙+ | X | ○ | ○ | ○ | Comparative Example |
| 24 | ⊙+ | X | ○ | ○ | ○ | Comparative Example |
| 25 | X | ○ | ○ | ○ | ○ | Comparative Example |
| 26 | X | ○ | ○ | ○ | ○ | Comparative Example |
| 27 | X | ○ | ○ | ○ | ○ | Comparative Example |
| 28 | X | ○ | ○ | ○ | ○ | Comparative Example |
| 29 | X | ○ | ○ | ○ | ○ | Comparative Example |
| 30 | X | ○ | ○ | ○ | ○ | Comparative Example |
| 31 | X | ○ | ○ | ○ | ○ | Comparative Example |
| 32 | X | ○ | ○ | ○ | ○ | Comparative Example |
| 33 | ⊙ | ○ | ⊙ | ○ | ○ | Inventive Example |
| 34 | ⊙ | ○ | ⊙ | ○ | ○ | Inventive Example |
| 35 | ⊙ | ○ | ⊙ | ○ | ○ | Inventive Example |
| 36 | ○ | ○ | ⊙ | ○ | ○ | Inventive Example |
| 37 | ⊙ | ○ | ⊙ | ○ | ○ | Inventive Example |
| 38 | ⊙ | ○ | ⊙ | ○ | ○ | Inventive Example |
| 39 | ⊙ | ○ | ⊙ | ○ | ○ | Inventive Example |
| 40 | ⊙ | ○ | ⊙ | ○ | ○ | Inventive Example |
| 41 | ⊙ | ○ | ⊙ | ○ | ○ | Inventive Example |
| 42 | ⊙ | ○ | ⊙ | ○ | ○ | Inventive Example |
| 43 | ⊙ | ○ | ⊙ | ○ | ○ | Inventive Example |
| 44 | ⊙ | ○ | ⊙ | ○ | ○ | Inventive Example |
| 45 | ⊙ | ○ | ⊙ | ○ | ○ | Inventive Example |
| 46 | ⊙ | ○ | ⊙ | ○ | ○ | Inventive Example |
| 47 | ⊙ | ○ | ⊙ | ○ | ○ | Inventive Example |
| 48 | ⊙ | ○ | ⊙ | ○ | ○ | Inventive Example |

TABLE 10-10

| | Quality characteristics | | | | | |
|---|---|---|---|---|---|---|
| No. | Fingerprint resistance | Powdering resistance | Corrosion resistance | External appearance | Blackening resistance | Category |
| 49 | ⊙ | ○ | ○ | ○ | ○ | Inventive Example |
| 50 | ⊙ | ○ | ○ | ○ | ○ | Inventive Example |
| 51 | ○ | ○ | ○ | ○ | ○ | Inventive Example |
| 52 | ⊙ | ○ | ○ | ○ | ○ | Inventive Example |
| 53 | ⊙ | ○ | ○ | ○ | ○ | Inventive Example |
| 54 | ⊙ | ○ | ○ | ○ | ○ | Inventive Example |
| 55 | ○ | ○ | ○ | ○ | ○ | Inventive Example |
| 56 | ⊙ | ○ | ○ | ○ | ○ | Inventive Example |
| 57 | ⊙ | ○ | ⊙ | △ | ○ | Inventive Example |
| 58 | ⊙ | ○ | ⊙ | △ | ○ | Inventive Example |
| 59 | ⊙ | ○ | ⊙ | △ | ○ | Inventive Example |
| 60 | ⊙ | ○ | ⊙ | △ | ○ | Inventive Example |
| 61 | ⊙ | ○ | ⊙ | △ | ○ | Inventive Example |

TABLE 10-10-continued

| | Quality characteristics | | | | | |
|---|---|---|---|---|---|---|
| No. | Fingerprint resistance | Powdering resistance | Corrosion resistance | External appearance | Blackening resistance | Category |
| 62 | ⊙ | ○ | ⊙ | Δ | ○ | Inventive Example |
| 63 | ⊙ | ○ | ⊙ | Δ | ○ | Inventive Example |
| 64 | ⊙ | ○ | ⊙ | Δ | ○ | Inventive Example |
| 65 | ○ | ○ | ○ | ○ | ○ | Inventive Example |
| 66 | ⊙ | ○ | ○ | ○ | ○ | Inventive Example |
| 67 | ⊙ | ○ | ○ | ○ | ○ | Inventive Example |
| 68 | ⊙ | ○ | ○ | ○ | ○ | Inventive Example |
| 69 | ⊙ | ○ | ○ | ○ | ○ | Inventive Example |
| 70 | ○ | ○ | ○ | ○ | ○ | Inventive Example |
| 71 | ⊙ | ○ | ○ | ○ | ⊙ | Inventive Example |
| 72 | ⊙ | ○ | ○ | ○ | ⊙ | Inventive Example |
| 73 | ⊙ | ○ | ○ | ○ | ⊙ | Inventive Example |
| 74 | ○ | ○ | ○ | ○ | ⊙ | Inventive Example |
| 75 | ⊙ | ○ | ○ | ○ | ⊙ | Inventive Example |
| 76 | ⊙ | ○ | ○ | ○ | ⊙ | Inventive Example |
| 77 | ⊙ | ○ | ○ | ○ | ⊙ | Inventive Example |
| 78 | ⊙ | ○ | ○ | ○ | ⊙ | Inventive Example |
| 79 | ⊙ | ○ | ○ | ○ | ⊙ | Inventive Example |
| 80 | ⊙ | ○ | ○ | ○ | ⊙ | Inventive Example |
| 81 | ○ | ○ | ⊙ | ○ | ⊙ | Inventive Example |
| 82 | ⊙ | ○ | ⊙ | ○ | ⊙ | Inventive Example |
| 83 | ⊙ | ○ | ⊙ | ○ | ⊙ | Inventive Example |
| 84 | ○ | ○ | ⊙ | ○ | ⊙ | Inventive Example |
| 85 | ⊙ | ○ | ⊙ | ○ | ⊙ | Inventive Example |
| 86 | ⊙ | ○ | ⊙ | ○ | ⊙ | Inventive Example |
| 87 | ○ | ○ | ⊙ | ○ | ⊙ | Inventive Example |
| 88 | ⊙ | ○ | ⊙ | ○ | ⊙ | Inventive Example |
| 89 | ⊙ | ○ | ⊙ | ○ | ⊙ | Inventive Example |
| 90 | ⊙ | ○ | ⊙ | ○ | ⊙ | Inventive Example |
| 91 | ⊙ | ○ | ⊙ | ○ | ⊙ | Inventive Example |
| 92 | ⊙ | ○ | ⊙ | ○ | ⊙ | Inventive Example |
| 93 | ⊙ | ○ | ⊙ | ○ | ⊙ | Inventive Example |
| 94 | ⊙ | ○ | ⊙ | ○ | ⊙ | Inventive Example |
| 95 | ⊙ | ○ | ⊙ | ○ | ⊙ | Inventive Example |
| 96 | ⊙ | ○ | ⊙ | ○ | ⊙ | Inventive Example |

TABLE 10-11

| | Quality characteristics | | | | | |
|---|---|---|---|---|---|---|
| No. | Fingerprint resistance | Powdering resistance | Corrosion resistance | External appearance | Blackening resistance | Category |
| 97 | ⊙ | ○ | ○ | ○ | ○ | Inventive Example |
| 98 | ○ | ○ | ○ | ○ | ○ | Inventive Example |
| 99 | ○ | ○ | ○ | ○ | ○ | Inventive Example |
| 100 | ⊙ | ○ | ○ | ○ | ○ | Inventive Example |
| 101 | ⊙ | ○ | ○ | ○ | ○ | Inventive Example |
| 102 | ⊙ | ○ | ○ | ○ | ○ | Inventive Example |
| 103 | ⊙ | ○ | ○ | ○ | ○ | Inventive Example |
| 104 | ⊙ | ○ | ○ | ○ | ○ | Inventive Example |
| 105 | ⊙ | ○ | ○ | ○ | ○ | Inventive Example |
| 106 | ○ | ○ | ○ | ○ | ○ | Inventive Example |
| 107 | ⊙ | ○ | ○ | ○ | ○ | Inventive Example |
| 108 | ⊙ | ○ | ○ | ○ | ○ | Inventive Example |
| 109 | ⊙ | ○ | ○ | ○ | ○ | Inventive Example |
| 110 | ⊙ | ○ | ○ | ○ | ○ | Inventive Example |
| 111 | ○ | ○ | ○ | ○ | ○ | Inventive Example |
| 112 | ⊙ | ○ | ○ | ○ | ○ | Inventive Example |
| 113 | ⊙ | ○ | ⊙ | ○ | ⊙ | Inventive Example |
| 114 | ⊙ | ○ | ⊙ | ○ | ⊙ | Inventive Example |
| 115 | ⊙ | ○ | ⊙ | ○ | ⊙ | Inventive Example |
| 116 | ⊙ | ○ | ⊙ | ○ | ⊙ | Inventive Example |
| 117 | ⊙ | ○ | ⊙ | ○ | ⊙ | Inventive Example |
| 118 | ⊙ | ○ | ⊙ | ○ | ⊙ | Inventive Example |
| 119 | ⊙ | ○ | ⊙ | ○ | ⊙ | Inventive Example |
| 120 | ⊙ | ○ | ⊙ | ○ | ⊙ | Inventive Example |
| 121 | ⊙ | ○ | ⊙ | ○ | ⊙ | Inventive Example |
| 122 | ⊙ | ○ | ⊙ | ○ | ⊙ | Inventive Example |

TABLE 10-12

| No. | Fingerprint resistance | Powdering resistance | Corrosion resistance | External appearance | Blackening resistance | Category |
|---|---|---|---|---|---|---|
| 129 | ○ | ○ | △ | ○ | ○ | Inventive Example |
| 130 | ⊙ | ○ | △ | ○ | ○ | Inventive Example |
| 131 | ○ | ○ | △ | ○ | ○ | Inventive Example |
| 132 | ⊙ | ○ | △ | ○ | ○ | Inventive Example |
| 133 | ○ | ○ | △ | ○ | ○ | Inventive Example |
| 134 | ⊙ | ○ | △ | ○ | ○ | Inventive Example |
| 135 | ⊙ | ○ | △ | ○ | ○ | Inventive Example |
| 136 | ⊙ | ○ | △ | ○ | ○ | Inventive Example |
| 137 | X | ○ | ○ | ○ | ○ | Comparative Example |
| 138 | X | ○ | ○ | ○ | ○ | Comparative Example |
| 139 | X | ○ | ○ | ○ | ○ | Comparative Example |
| 140 | X | ○ | ○ | ○ | ○ | Comparative Example |
| 141 | X | ○ | ○ | ○ | ○ | Comparative Example |
| 142 | X | ○ | ○ | ○ | ○ | Comparative Example |
| 143 | X | ○ | ○ | ○ | ○ | Comparative Example |
| 144 | X | ○ | ○ | ○ | ○ | Comparative Example |
| 145 | ○ | ○ | X | ○ | ○ | Comparative Example |
| 146 | ⊙ | ○ | X | ○ | ○ | Comparative Example |
| 147 | ⊙ | ○ | X | ○ | ○ | Comparative Example |
| 148 | ⊙ | ○ | X | ○ | ○ | Comparative Example |
| 149 | ⊙ | △ | △ | ○ | ○ | Inventive Example |
| 150 | ○ | △ | △ | ○ | ○ | Inventive Example |
| 151 | ⊙ | △ | △ | ○ | ○ | Inventive Example |
| 152 | ⊙ | △ | △ | ○ | ○ | Inventive Example |
| 153 | ⊙ | ○ | ○ | ○ | ○ | Inventive Example |
| 154 | ⊙ | ○ | ○ | ○ | ○ | Inventive Example |
| 155 | ⊙ | ○ | ○ | ○ | ○ | Inventive Example |
| 156 | ⊙ | ○ | ○ | ○ | ○ | Inventive Example |
| 157 | ⊙ | ○ | ⊙ | △ | ○ | Inventive Example |
| 158 | ⊙ | ○ | ⊙ | △ | ○ | Inventive Example |
| 159 | ⊙ | ○ | ⊙ | △ | ○ | Inventive Example |
| 160 | ⊙ | ○ | ⊙ | △ | ○ | Inventive Example |
| 161 | ⊙ | ○ | ○ | ○ | ○ | Inventive Example |
| 162 | ⊙ | ○ | ○ | ○ | ○ | Inventive Example |
| 163 | ⊙ | ○ | ○ | ○ | ○ | Inventive Example |
| 164 | ○ | ○ | ○ | ○ | ○ | Inventive Example |
| 165 | ○ | ○ | X | ○ | ○ | Comparative Example |
| 166 | ○ | ○ | X | ○ | ○ | Comparative Example |
| 167 | ○ | ○ | X | ○ | ○ | Comparative Example |
| 168 | ○ | ○ | X | ○ | ○ | Comparative Example |
| 169 | ○ | ○ | X | ○ | ○ | Comparative Example |
| 170 | ○ | ○ | X | ○ | ○ | Comparative Example |
| 171 | ○ | ○ | X | ○ | ○ | Comparative Example |

As is apparent from Tables 1 to 10 to 12, Invention Examples Nos, 1 to 16, 33 to 122, 129 to 136 and 149 to 164 in which the chemical conversion treatment layer contains predetermined amounts of Si, C, O and P and the maximum value of the P concentration of the surface layer region is 1.5 times to 5.0 times the average P concentration of the intermediate region were excellent in the fingerprint resistance while having sufficient powdering resistance and corrosion resistance.

On the other hand, Comparative Examples Nos. 17 to 32, 137 to 148 and 165 to 171 were poor in any of fingerprint resistance, powdering resistance and corrosion resistance.

Among the inventive examples, those in which Al is present in the interface side region and the F content of the interface side region is 20% or more of the F content of the entire chemical conversion treatment layer were further excellent in corrosion resistance.

When Sb was present in the interface side region, further excellent blackening resistance was exhibited.

BRIEF DESCRIPTION OF THE REFERENCE SYMBOLS

1 Surface-treated steel sheet
11 Steel sheet
12 Plated layer
13 Chemical conversion treatment layer
101 Surface layer region
102 Interface side region
103 Intermediate region

What is claimed is:

1. A surface-treated steel sheet comprising:
 a steel sheet;
 a zinc-based plated layer formed on a surface of the steel sheet; and
 a chemical conversion treatment layer formed on a surface of the zinc-based plated layer,
 wherein the chemical conversion treatment layer contains Si, C, O and P,
 the chemical conversion treatment layer has an average C concentration across the entire chemical conversion treatment layer of 20.0 mass % or more, an average O concentration across the entire chemical conversion treatment layer of 15.0 mass % or more, an average Si concentration across the entire chemical conversion treatment layer of 10.0 mass % or more, and an average P concentration across the entire chemical conversion treatment layer of 0.10 mass % or more,
 when t is a thickness of the chemical conversion treatment layer, an area starting from a surface of the chemical conversion treatment layer and ending at a position of t/10 from the surface of the chemical conversion treatment layer in a thickness direction is a surface layer region, an area starting from the position of 9t/10 from the surface of the chemical conversion treatment layer in the thickness direction and ending at an interface between the chemical conversion treatment layer and the zinc-based plated layer is an interface side region, and a region sandwiched between the surface layer region and the interface side region is an intermediate region,
 a maximum value of a mass % P concentration of the surface layer region is 1.5 times to 5.0 times an average mass % P concentration of an intermediate region.

2. The surface-treated steel sheet according to claim 1, wherein Al is present in the interface side region, and
 an F content, on a mass basis, of the interface side region is 20% or more of an F content, on a mass basis, of the entire chemical conversion treatment layer.

3. The surface-treated steel sheet according to claim 2, wherein
 Sb is present in the interface side region.

4. The surface-treated steel sheet according to claim 3, wherein
 a surface of the zinc-based plated layer is regular spangle-finished.

5. The surface-treated steel sheet according to claim 2, wherein
 a surface of the zinc-based plated layer is regular spangle-finished.

6. The surface-treated steel sheet according to claim 1, wherein
 Sb is present in the interface side region.

7. The surface-treated steel sheet according to claim 6, wherein
 a surface of the zinc-based plated layer is regular spangle-finished.

8. The surface-treated steel sheet according to claim 1, wherein
 a surface of the zinc-based plated layer is regular spangle-finished.

* * * * *